United States Patent
Kumada et al.

(10) Patent No.: US 7,330,173 B2
(45) Date of Patent: Feb. 12, 2008

(54) DISPLAY AND METHOD OF DRIVING THE SAME

(75) Inventors: Kouji Kumada, Tokyo (JP); Noriyuki Tanaka, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 483 days.

(21) Appl. No.: 11/104,465

(22) Filed: Apr. 13, 2005

(65) Prior Publication Data

US 2005/0231494 A1  Oct. 20, 2005

(30) Foreign Application Priority Data

Apr. 19, 2004 (JP) ............................. 2004-123143
Feb. 14, 2005 (JP) ............................. 2005-036949

(51) Int. Cl.
*G09G 3/36* (2006.01)

(52) U.S. Cl. ...................... 345/103; 345/98; 345/100

(58) Field of Classification Search ................. 345/87, 345/98, 99, 100, 103

See application file for complete search history.

(56) References Cited

U.S. PATENT DOCUMENTS 6,028,587 A * 2/2000 Igari ........................... 345/597
6,118,430 A * 9/2000 Igari ........................... 715/856
6,377,235 B1 * 4/2002 Murade et al. ............. 345/100
6,784,868 B2 * 8/2004 Murahashi et al. ......... 345/103
2004/0246428 A1 12/2004 Shirato
2006/0164363 A1 * 7/2006 Battersby et al. ............ 345/98

FOREIGN PATENT DOCUMENTS

| JP | 2001-67049 A  | 3/2001  |
| JP | 2001-282145 A | 10/2001 |
| JP | 2003-131250 A | 5/2003  |
| JP | 2004-117755 A | 4/2004  |

* cited by examiner

*Primary Examiner*—Richard Hjerpe
*Assistant Examiner*—Kimnhung Nguyen
(74) *Attorney, Agent, or Firm*—Harness, Dickey & Pierce, P.L.C.

(57) ABSTRACT

In a display, a first liquid crystal panel has gate bus lines, source bus lines, TFTs, and pixel electrodes, as well as a source driver. A second liquid crystal panel has gate bus lines, source bus lines, TFTs, and pixel electrodes. The source bus lines of the second liquid crystal panel are connected to the associated source bus lines of the first liquid crystal panel through switching TFTs. The source bus lines of the second liquid crystal panel are briefly and repeatedly fed with a predetermined potential when the switching TFTs are off. The invention reduces power consumption of dual panel structure displays and prevents occurrence of an unintended display on the second display panel which is not expected to produce any display.

86 Claims, 17 Drawing Sheets

DISPLAY AND METHOD OF DRIVING THE SAME

This Nonprovisional application claims priority under 35 U.S.C. § 119(a) on Patent Application No. 2004-123143 filed in Japan on Apr. 19, 2004, Patent Application No. 2005-036949 filed in Japan on Feb. 14, 2005, and the entire contents of which are hereby incorporated by reference.

FIELD OF THE INVENTION

The present invention relates to liquid crystal and like displays containing multiple active matrix display panels. The invention relates also to methods of driving these displays.

BACKGROUND OF THE INVENTION

Many recent mobile devices among others, especially foldable mobile phones, have two display panels, or so-called "dual panels." As an example, FIG. 18 shows a circuit diagram of dual panels 581 comprising a main panel 582 and a subpanel 583.

The main panel 582 contains a TFT (thin film transistor) substrate 584, an opposite substrate 585, and a liquid crystal (LC) layer 594. The TFT substrate 584 is a substrate carrying TFTs 592 thereon. The opposite substrate 585 is placed opposite the TFT substrate 584. The LC 594 is a display medium interposed between the TFT substrate 584 and the opposite substrate 585.

On the TFT substrate 584 are there provided gate bus lines 588 and source bus lines 589. A TFT 592 is formed near each intersection of the gate bus lines 588 and the source bus lines 589. The TFT 592 is connected to the gate bus line 588 at the gate, to the source bus line 589 at the source, and to a pixel electrode at the drain. Voltage is applied across the LC 594 in a pixel between the pixel electrode and an opposite electrode (COM) 593 on the opposite substrate 585. This mechanism applies to every TFT 592 across the panel 582, which enables image displays.

The main panel 582 further contains a gate driver 590 and a source driver 591. Lead wires from the gate driver 590 are connected to the gate bus lines 588. Those from the source driver 591 are connected to the source bus lines 589. The gate driver 590 and the source driver 591 apply gate signal voltages and display data signals to the bus lines respectively.

In contrast, the subpanel 583 contains a TFT substrate 586, an opposite substrate 587, and a liquid crystal (LC) layer 594. The TFT substrate 586 is a substrate carrying TFTs 592 thereon. The opposite substrate 587 is placed opposite the TFT substrate 586. The LC 594 is a display medium interposed between the TFT substrate 586 and the opposite substrate 587.

The subpanel 583 is connected to the main panel 582 through a FPC (flexible printed circuit; not shown) board. By virtue of this structure, gate signal voltages and display data signals are fed from the gate driver 590 and the source driver 591 in the main panel 582 to the bus lines in the subpanel 583 through wiring in the main panel 582 and the FPC board.

On the TFT substrate 586 are there provided gate bus lines 588 and source bus lines 589. A TFT 592 is formed near each intersection of the gate bus lines 588 and the source bus lines 589. The TFT 592 is connected to the gate bus line 588 at the gate, to the source bus line 589 at the source, and to a pixel electrode at the drain. Voltage is applied across the LC 594 in a pixel between the pixel electrode and an opposite electrode (COM) 593 on the opposite substrate 587. This mechanism applies to every TFT 592 across the panel 583, which enables image displays. Both the main panel 582 and the subpanel 583 can thus produce image displays.

Examples of prior art literature disclosing concrete dual panel devices include Japanese published patent applications 2001-067049 (Tokukai 2001-067049; published on Mar. 16, 2001), 2001-282145 (Tokukai 2001-282145; published on Oct. 12, 2001), and 2003-131250 (Tokukai 2003-131250; published on May 8, 2003, corresponding to U.S. Patent Application No. 2004/0246428; published on Dec. 9, 2004).

Tokukai 2001-067049 discloses a foldable mobile communications terminal with dual panels: a first liquid crystal display section (first liquid crystal display) and a second liquid crystal display section (second liquid crystal display). The mobile communications terminal is constructed so that a cover section (folder cover) opens/closes on a main body section. The first liquid crystal display section is provided on a face of the cover section which comes inside when the device is folded. The second liquid crystal display section is provided on another face of the cover section which comes outside when the device is folded. The first and second liquid crystal display sections are driven by one driver disposed on the first liquid crystal display section. The driver's outputs are fed to the second liquid crystal display section through the first liquid crystal display section. The second liquid crystal display section is smaller in display area than the first liquid crystal display section. See Tokukai 2001-067049, FIGS. 4, 5. The second liquid crystal display section shows the time and other rudimentary information. The first liquid crystal display section shows various information. In addition, when the cover section is closed, only the second liquid crystal display section produces displays. When the cover section is open, only the first liquid crystal display section produces displays.

Tokukai 2001-282145 discloses a foldable mobile phone with dual panels: a first liquid crystal display section (internal liquid crystal display section) and a second liquid crystal display section (external liquid crystal display section) similarly to Tokukai 2001-067049. The mobile phone is constructed so that a cover section (upper casing) opens/closes on a main body section (lower casing). The first liquid crystal display section is provided on a face of the cover section which comes inside when the device is folded. The second liquid crystal display section is provided on another face of the cover section which comes outside when the device is folded. The first and second liquid crystal display sections are driven by one driver disposed on the first liquid crystal display section. The driver's outputs are fed to the second liquid crystal display section through the first liquid crystal display section. The second liquid crystal display section is smaller in display area than the first liquid crystal display section. See Tokukai 2001-282145, FIGS. 3, 4. When the cover section is closed, only the second liquid crystal display section produces displays. When the cover section is open, only the first liquid crystal display section produces displays.

Tokukai 2003-131250 discloses a foldable mobile phone with dual panels: a first liquid crystal display section (LCD) and a second liquid crystal display section (LCD) similarly to Tokukai 2001-067049. The mobile phone is constructed so that a cover section (lid) opens/closes on a main body section. The first liquid crystal display section is provided on a face of the cover section which comes inside when the device is folded. The second liquid crystal display section is provided on another face of the cover section which comes outside when the device is folded. The first and second liquid crystal display sections are driven by one driver disposed on the first liquid crystal display section. The driver's outputs are fed to the second liquid crystal display section through the first liquid crystal display section. The second liquid crystal display section is smaller in display area than the first liquid crystal display section. See Tokukai 2003-131250, FIGS. 1, 10. The second liquid crystal display section displays a notice of an incoming call, the time and date, and other simple information. The first liquid crystal display section displays major information.

As detailed above, dual panel displays are widely applied to mobile phone and like mobile devices. Demand exists for low power consumption panels. The conventional devices are, however, short of addressing the issue properly.

SUMMARY OF THE INVENTION

The present invention, to address the issue, has an objective to offer a liquid crystal display which achieves sufficient reduction in power consumption and also to offer its drive method.

A display of the present invention is characterized in that it includes:
- a first display section including: gate signal lines; source signal lines; first switching elements provided near intersections of the gate signal lines and the source signal lines, control terminals for switching operation of the first switching elements being connected to the gate signal lines; and pixel electrodes connected to the source signal lines through the first switching elements;
- a source signal line drive circuit provided to the first display section to supply display data signals to the source signal lines;
- second switching elements containing semiconductor elements;
- a second display section including: the gate signal lines; source signal lines; first switching elements; and pixel electrodes, the source signal lines of the second display section being connected to the associated source signal lines of the first display section through the second switching elements, the second display section sharing the source signal line drive circuit with the first display section; and
- a predetermined potential supply section briefly and repeatedly supplying a predetermined potential to the source signal lines of the second display section when the second switching elements are off.

Another display of the present invention is characterized in that it includes:
- a first display section including: gate signal lines; source signal lines; first switching elements provided near intersections of the gate signal lines and the source signal lines, control terminals for switching operation of the first switching elements being connected to the gate signal lines; and pixel electrodes connected to the source signal lines through the first switching elements;
- a source signal line drive circuit provided to the first display section to supply display data signals to the source signal lines;
- second switching elements containing semiconductor elements;
- a second display section including: the gate signal lines; source signal lines; first switching elements; and pixel electrodes, the source signal lines of the second display section being connected to the associated source signal lines of the first display section through the second switching elements, the second display section sharing the source signal line drive circuit with the first display section; and
- a control section: controlling on/off operation of the second switching elements; causing the second switching elements to carry out recursive temporary switch-on actions where the second switching elements briefly and repeatedly switch on when the second switching elements are off; and causing the source signal line drive circuit to supply a predetermined potential to the source signal lines of the first display elements during the recursive temporary switch-on actions.

A method of driving a display of the present invention is characterized in that the method involves a display including a first display section and a second display section,
the first display section including: gate signal lines; source signal lines; first switching elements provided near intersections of the gate signal lines and the source signal lines, control terminals for switching operation of the first switching elements being connected to the gate signal lines; and pixel electrodes connected to the source signal lines through the first switching elements,
the second display section including: the gate signal lines; source signal lines; first switching elements; and pixel electrodes,
the method including the steps of:
connecting the source signal lines of the second display section to the associated source signal lines of the first display section through second switching elements containing semiconductor elements;
supplying display data signals to the source signal lines of the second display section through the source signal lines of the first display section; and
briefly and repeatedly supplying a predetermined potential to the source signal lines of the second display section when the second switching elements are off.

Another method of driving a display of the present invention is characterized in that the method involves a display including a first display section and a second display section,
the first display section including: gate signal lines; source signal lines; first switching elements provided near intersections of the gate signal lines and the source signal lines, control terminals for switching operation of the first switching elements being connected to the gate signal lines; and pixel electrodes connected to the source signal lines through the first switching elements,
the second display section including: the gate signal lines; source signal lines; first switching elements; and pixel electrodes,
the method including the steps of:
connecting the source signal lines of the second display section to the associated source signal lines of the first display section through second switching elements containing semiconductor elements;
supplying display data signals to the source signal lines of the second display section through the source signal lines of the first display section; and
causing the second switching elements to carry out recursive temporary switch-on actions where the second switching elements briefly and repeatedly switch on when the second switching elements are off; and supplying a predetermined potential to the source signal lines of the first display section during the recursive temporary switch-on actions.

According to the arrangement, when the first display section carries out a display operation, and the second display section stops a display operation, the second display section can be isolated from the first display section. Thus, the second display section does not act as an electrical load, and the power consumption can be lowered.

In addition, while the second display section is isolated from the first display section, that is, when the second switching elements are off, a predetermined potential is briefly and repeatedly supplied to the source signal lines of the second display section. Therefore, although even when the second switching elements containing semiconductor elements are turned off, the elements may suffer from current leak, possibly gradually changing the potentials of the source signal lines of the second display section, the source signal lines of the second display section are retained at the predetermined potential. Thus, the potential differences across the pixel electrodes and the opposite electrode become equal to a predetermined level in the second display section carrying out no display operation. No unintended display occurs which otherwise could be caused by the potential difference.

If the second switching elements did not carry out the recursive temporary switch-on actions while the second switching elements are turned off, the leak current through the second switching elements would cause the potentials of the source signal lines of the second display section to become equal to a mean value of the potentials of the source signal lines of the first display section carrying out a display operation. The mean value of the electrical potentials might slightly differ from one source signal line to the other depending on the display image produced on the first display section. In such a case, the potential differences across the pixel electrodes and the opposite electrode of the second display section would become non-uniform, resulting in the display screen of the second display section appearing visually undesirable. These issues are addressed, as described in the foregoing, by the recursive temporary switch-on actions which results in the predetermined potential being supplied to the source signal lines of the second display section.

DESCRIPTION OF THE EMBODIMENTS

Embodiment 1

The following will describe an embodiment of the present invention in reference to drawings.

Figure 1:
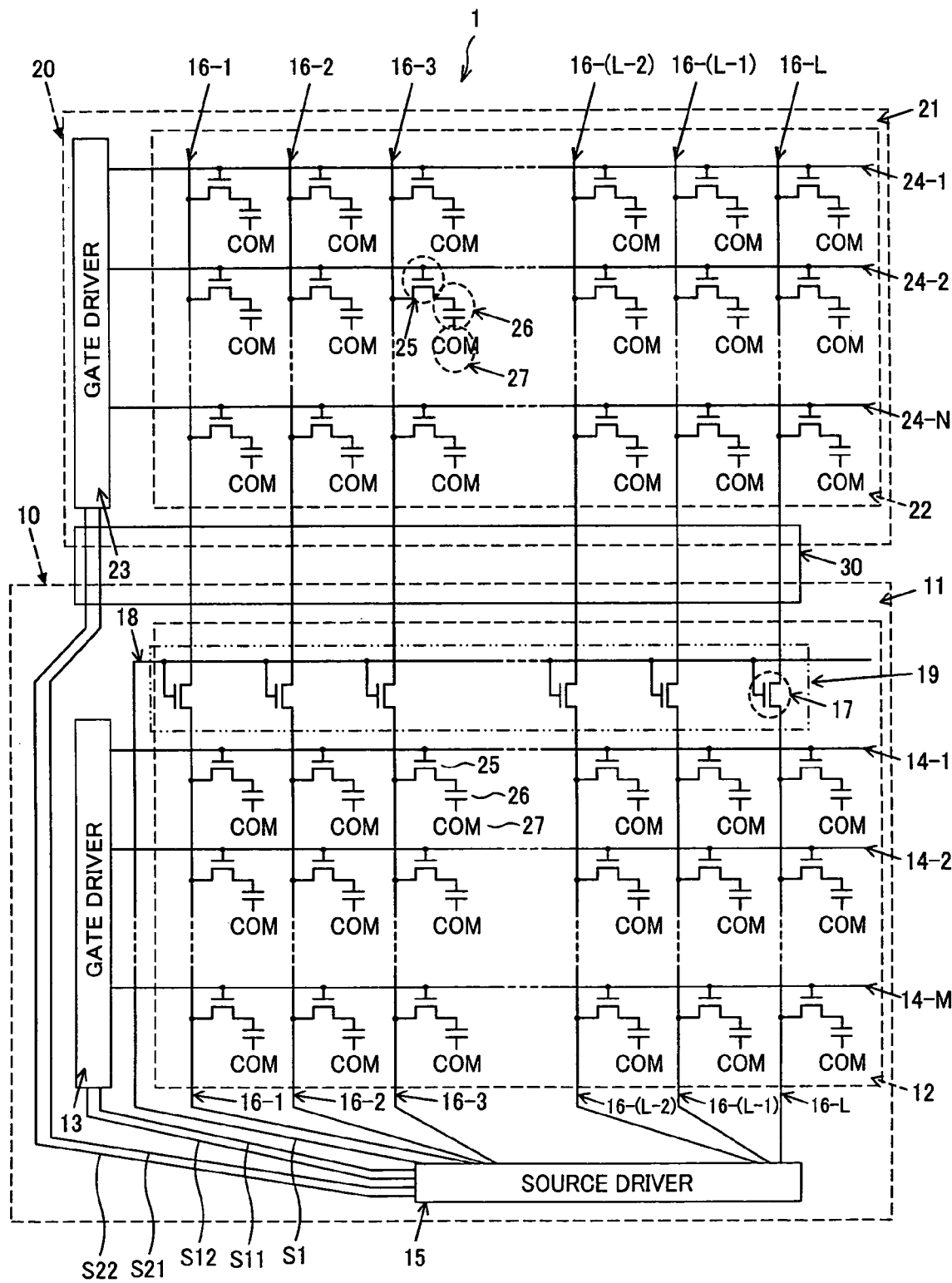
FIG. 1 is a circuit diagram illustrating the structure of a display in accordance with an embodiment of the present invention.

FIG. 1 shows a circuit diagram of a liquid crystal display (display) 1 of the present embodiment. The liquid crystal display 1, as shown in FIG. 1, has a dual panel structure including a first liquid crystal panel (first display means) 10 and a second liquid crystal panel (second display means) 20.

The first liquid crystal panel 10 contains a thin film transistor (TFT) substrate 11, an opposite substrate 12, and a liquid crystal layer. The TFT substrate 11 carries TFTs 25 thereon. The opposite substrate 12 is placed opposite this TFT substrate 11. The liquid crystal layer is a display medium interposed between the TFT substrate 11 and the opposite substrate 12. The liquid crystal layer is part of liquid crystal capacitors 26.

On the TFT substrate 11 are there provided gate bus lines (gate signal lines) 14 and source bus lines (source signal lines) 16. A TFT (first switching means) 25 is formed near each intersection of the gate bus line 14 and the source bus line 16. The TFT 25 is connected to the gate bus line 14 at the gate, to the source bus line 16 at the source, and to a pixel electrode at the drain. Voltage is applied across the liquid crystal capacitor 26 in a pixel between the pixel electrode and an opposite electrode (COM) 27 on the opposite substrate 12. This mechanism applies to every TFT 25 across the panel 10, which enables image displays.

The second liquid crystal panel 20 contains a TFT substrate 21, an opposite substrate 22, and a liquid crystal layer. The TFT substrate 21 carries TFTs 25 thereon. The opposite substrate 22 is placed opposite the TFT substrate 21. The liquid crystal layer is a display medium interposed between the TFT substrate 21 and the opposite substrate 22. The liquid crystal layer is part of liquid crystal capacitors 26.

On the TFT substrate 21 are there provided gate bus lines 24 and source bus lines 16. A TFT 25 is formed near each intersection of the gate bus line 14 and the source bus line 16. The TFT 25 is connected to the gate bus line 24 at the gate, to the source bus line 16 at the source, and to a pixel electrode at the drain. Voltage is applied across the liquid crystal capacitor 26 in a pixel between the pixel electrode and an opposite electrode (COM) 27 on the opposite substrate 22. This mechanism applies to every TFT 25 across the panel 20, which enables image displays.

In FIG. 1, the suffixes "-L, -M, -N" to the reference numerals for the source bus lines 16 and the gate bus lines 14, 24 indicate line numbers of the lines. "L, M, N" represent the total number of the lines. The following description will not use the suffixes "-L, -M, -N" if the line in issue does not have to be any particular line.

In the liquid crystal display 1 of the present embodiment, those source bus lines 16 on the first liquid crystal panel 10 correspond respectively to those source bus lines 16 on the second liquid crystal panel 20. To be more specific, those source bus lines 16 which correspond to the gate bus lines 14 can conduct to those source bus lines 16 which correspond to the gate bus lines 24, and vice versa, via a switch section 19 and a FPC (flexible printed circuit) board 30. The board 30 is an example of a flexible connect member. The switch section 19 is provided on the first liquid crystal panel 10. The FPC board 30 is provided between the first liquid crystal panel 10 and the second liquid crystal panel 20. The location of the switch section 19 is not limited to the first liquid crystal panel 10. The section 19 may be provided on the second liquid crystal panel 20 or between the first liquid crystal panel 10 and the second liquid crystal panel 20.

The switch section 19 contains switching TFTs (second switching means) 17 and a switching control signal line 18. Each source bus line 16 has its own switching TFT 17. The switching TFT 17 connects/disconnects the source bus line 16 on the first liquid crystal panel 10 and the source bus line 16 on the second liquid crystal panel 20. The switching control signal line 18 is formed in parallel with the gate bus lines 14 to feed the gates of the switching TFTs 17 with a switching control signal that turns on/off the switching TFTs 17. The switching control signal is supplied from a source driver (source signal line drive circuit, predetermined potential supply means) 15 to the switching control signal line 18.

The first liquid crystal panel 10 and the second liquid crystal panel 20 include gate drivers (scan signal line drive circuits) 13, 23 dedicated respectively to drive the gate bus lines 14, 24. Also, the first liquid crystal panel 10 and the second liquid crystal panel 20 share a common source driver 15 to drive the source bus lines 16. The gate drivers 13, 23 output a gate signal (gate select signal) to the gate bus lines 14, 24. The source driver 15 outputs display data signals to the source bus lines 16. The source driver 15 is provided on the first liquid crystal panel 10 and supplies the display data signals to the second liquid crystal panel 20 via the first liquid crystal panel 10.

If the liquid crystal display 1 is incorporated in a single device, the first liquid crystal panel 10 is used to produce displays more frequently (more hours) than the second liquid crystal panel 20. For example, in the applied device, the first liquid crystal panel 10 is used to show the time, current status of the device, and other basic information. On the other hand, the second liquid crystal panel 20 is used to show information in more detail (detailed information) than the first liquid crystal panel 10. The display operation of the panel 20 is triggered by a user input.

Figure 2:
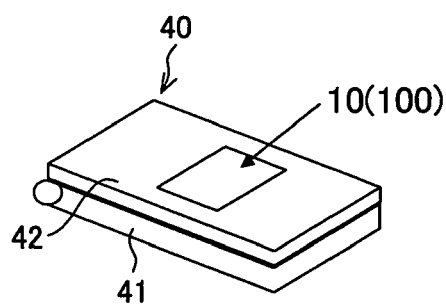
FIG. 2(a) is a perspective view illustrating a mobile phone containing the FIG. 1 display with a closed cover section.
FIG. 2(b) is a perspective view illustrating the mobile phone with the cover section being open.
Figure 2:
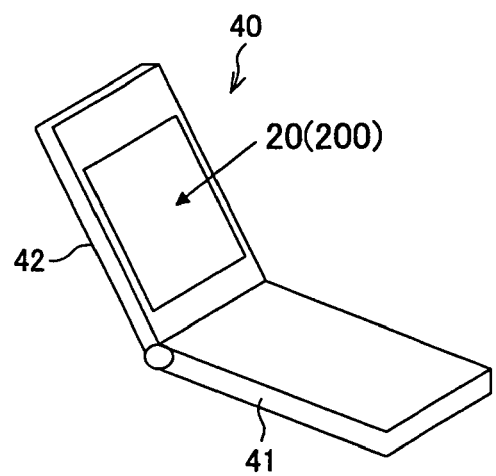
Figure 3:
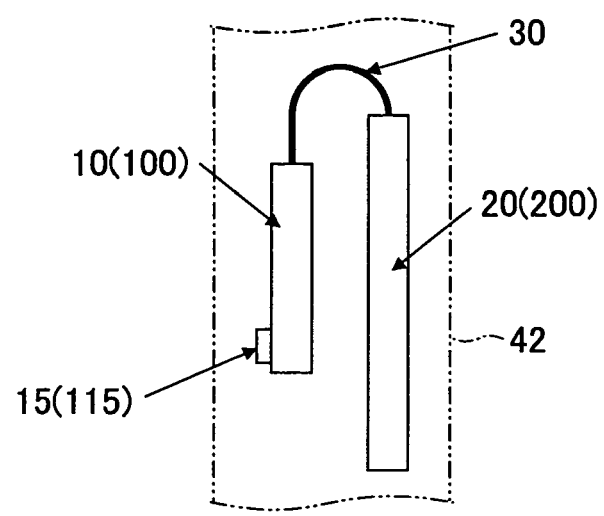
FIG. 3 is a vertical cross-sectional view illustrating a major part of the cover section in the FIG. 2 mobile phone.

Specifically, in a foldable mobile phone 40, a cover section (second housing section) 42 is formed so that it can open/close on the main body section (first housing section) 41 as shown in FIGS. 2(a), 2(b), for example. The first liquid crystal panel 10 is provided on a face of the cover section 42 which comes outside when the phone 40 is folded. The second liquid crystal panel 20 is provided on a face of the cover section 42 which comes inside when the phone 40 is folded. FIG. 3 shows a major part of this cover section 42 in a vertical cross-section. As shown in the figure, the first liquid crystal panel 10 and the second liquid crystal panel 20 are disposed back to back inside the cover section 42.

As described in the foregoing, in the liquid crystal display 1, the source driver 15 is disposed on the first liquid crystal panel 10 which is used to produce displays more frequently. The two display panels (first and second liquid crystal panels 10, 20) are driven by one drive circuit (source driver 15). Moreover, the switch section 19 can electrically isolate the two display panels (first and second liquid crystal panels 10, 20) from each other.

The cover section 42 is open while, for example, the user is speaking over the mobile phone 40, sending an email, or reading a received email on the mobile phone 40. In these events, the display operation of the first liquid crystal panel 10 is turned off, whereas the display operation of the second liquid crystal panel 20 is turned on. In contrast, when the mobile phone 40 is standing by with the cover section 42 closed (the power supply is turned on), the display operation of the first liquid crystal panel 10 is turned on, and the display operation of the second liquid crystal panel 20 is turned off. Generally, the cover section 42 of the mobile phone 40 is closed longer than it is open, for example, during a 24 hour period. The result is the first liquid crystal panel 10 producing displays more frequently than the second liquid crystal panel 20.

In the liquid crystal display 1, when the cover section 42 is closed, only the display operation of the first liquid crystal panel 10 is turned on; the display operation of the second liquid crystal panel 20 is turned off. In this situation, all the switching TFTs 17 in the switch section 19 are turned off by the switching control signal from the source driver 15. The source bus lines 16 on the second liquid crystal panel 20 are not fed with the display data signals from the source driver 15. The gate driver 13 keeps operating; on the other hand, the gate driver 23 stops operating.

The source driver 15 outputs the switching control signal, for example, by the following procedures: The mobile phone 40 has an open/close detect switch (an example of open/close detect means; not shown). The switch detects, for example, a closed cover section 42 and sends a detection signal to control means (not shown). The control means produces instructions based on which the source driver 15 generates the switching control signal for output.

In contrast, when the cover section 42 is open, only the display operation of the second liquid crystal panel 20 is turned on; the display operation of the first liquid crystal panel 10 is turned off. In this situation, all the switching TFTs 17 in the switch section 19 are turned on by the switching control signal from the source driver 15. The source bus lines 16 on the second liquid crystal panel 20 are fed with the display data signals from the source driver 15.

The gate driver 13 stops operating; on the other hand, the gate driver 23 keeps operating.

Next, the display operation of the first and second liquid crystal panels 10, 20 will be described in more detail.

Figure 4:
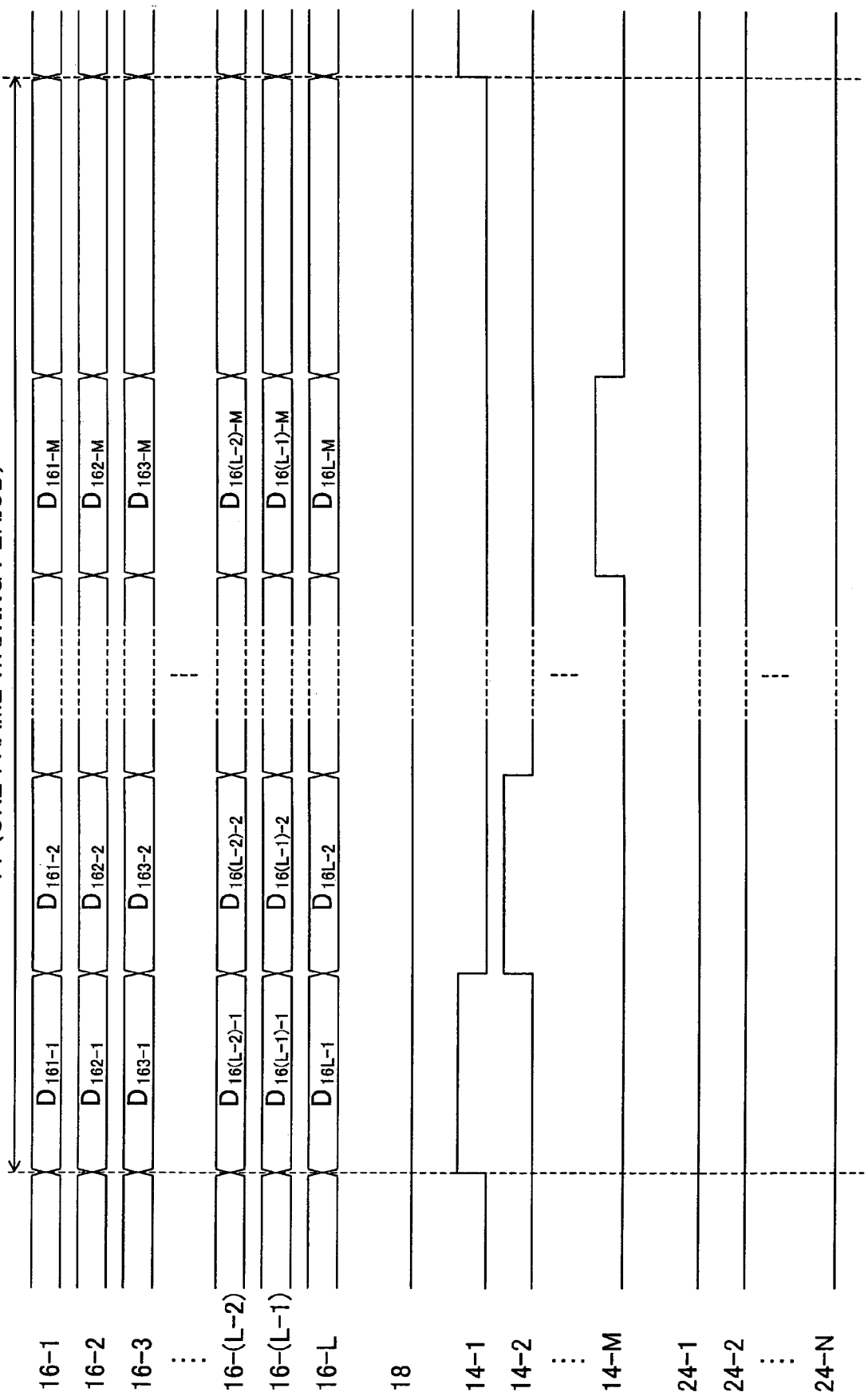
FIG. 4 is a timing chart illustrating an operation of a first liquid crystal panel in the FIG. 1 display to produce a display.

To produce a display on the first liquid crystal panel 10, as shown in FIG. 4, the source driver 15 feeds the source bus lines 16 with the display data signals. Further, the gate driver 13 feeds the gate bus lines 14 with the gate signals switching on/off the TFTs 25. In this situation, voltage goes HIGH on a gate bus line 14, switching on the TFT 25 connected to that gate bus line 14. The display data signal on the source bus line 16 is written to the pixel (liquid crystal capacitor 26).

To produce a display on the first liquid crystal panel 10, the gate bus lines 14-1 to 14-M are addressed a line at a time, while the source bus lines 16-1 to 16-L are being fed with the display data signals. This series of actions produces a frame. The series is repeated.

In this situation, the second liquid crystal panel 20 produces no displays. So, LOW voltage (switching control signal) is applied from the source driver 15 to the switching control signal line 18. This turns off all the switching TFTs 17 in the switch section 19 and electrically isolates the source bus lines 16 (16-1 to 16-L) on the second liquid crystal panel 20 from the source bus lines 16 (16-1 to 16-L) on the first liquid crystal panel 10. In addition, the gate bus lines 24 on the second liquid crystal panel 20 are not driven.

In the above operation, the load in the second liquid crystal panel 20 is electrically isolated when producing a display on the first liquid crystal panel 10 which produces displays more frequently. Therefore, the liquid crystal display 1 achieves lower power consumption.

Figure 5:
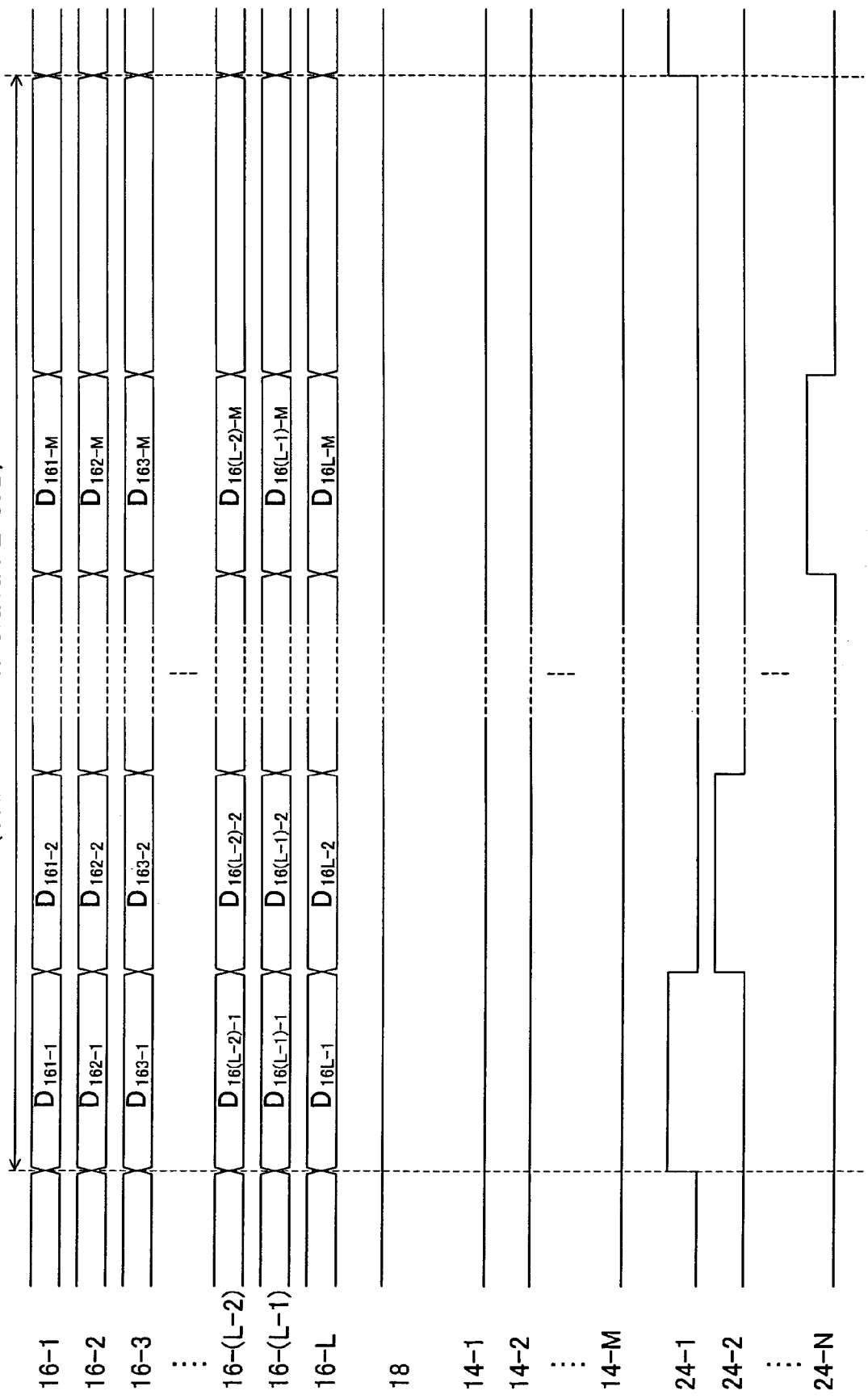
FIG. 5 is a timing chart illustrating an operation of a second liquid crystal panel in the FIG. 1 display to produce a display.

In contrast, to produce a display on the second liquid crystal panel 20, the display data signals are applied from the source driver 15 to the source bus lines 16, and the gate signals are applied from the gate driver 23 to the gate bus lines 24 to switch on/off the TFTs 25, as shown in FIG. 5. In this situation, as voltage on a gate bus line 24 goes HIGH, the TFT 25 connected to that gate bus line 24 is turned on. The display data signal on the source bus line 16 is written to the pixel (liquid crystal capacitor 26).

To produce a display on the second liquid crystal panel 20, the gate bus lines 24-1 to 24-N are addressed a line at a time, while the source bus lines 16-1 to 16-L are being fed with the display data signals. This series of actions produces a frame. The series is repeated.

Although the first liquid crystal panel 10 is currently producing no display, the display data signals need be applied to the second liquid crystal panel 20. So, HIGH voltage (switching control signal) is applied from the source driver 15 to the switching control signal line 18 so as to turn on all the switching TFTs 17 in the switch section 19. The gate bus lines 14-1 to 14-M are however not driven.

In the above operation, the load in the first liquid crystal panel 10 cannot be electrically isolated in producing a display on the second liquid crystal panel 20, which requires extra electric power. However, the second liquid crystal panel 20 is not used so frequently to produce a display. So, this situation happens only infrequently. In contrast, when the first liquid crystal panel 10, often used to produce a display, is used for that purpose, the second liquid crystal panel 20 is electrically isolated. The liquid crystal display 1 thus achieves overall reductions in power consumption.

The foregoing loads are primarily due to the capacitance of insulating sections where they cross the gate bus lines 14 and the parasitic capacitance of the TFTs 25, among other factors.

The layout of the first liquid crystal panel 10 and the second liquid crystal panel 20 in the mobile phone 40 is not limited to the one described above. An alternative example is, assuming that the mobile phone 40 is so constructed that the second housing section can open/close on the first housing section, to dispose: the first liquid crystal panel 10 so that when the second housing section is closed on the first housing section, the display plane of the panel 10 is on the outside face of either the first or second housing section; and the second liquid crystal panel 20 when the second housing section is closed on the first housing section, the display plane of the panel 20 on an inside face of either the first or second housing section. This is equally applicable to the relationship between a subpanel 100 and a main panel 200 which will be detailed later.

In the liquid crystal display 1 of the present embodiment, as described in the foregoing, the second liquid crystal panel 20 is isolated from the first liquid crystal panel 10 by the switch section 19 when producing a display not on the second liquid crystal panel 20 carrying no source driver 15, but only on the first liquid crystal panel 10 carrying the source driver 15. The isolation could entail inconveniences in producing a display on the second liquid crystal panel 20. Details follow.

The resistance value of the switching TFT 17 in the switch section 19 is at least 1000 times as high when it is switched off as when it is switched on. This does not mean, however, that the switching TFT 17 would absolutely cease conducting on a switch-off: a certain level of leak current could flow. The leak current would gradually move the potential of the source bus line 16 on the second liquid crystal panel 20 which is currently not being driven, until that potential ultimately would become equal to the mean value of the voltage on the source bus line 16 on the first liquid crystal panel 10 which is being driven. The gradually changing voltage on the source bus line 16 would be applied to the drain of the TFT 25 on the second liquid crystal panel 20, and in turn, to the pixel electrode connected to that drain. Resultant variations in the voltage across the pixel electrode and the opposite electrode could change the appearance of the second liquid crystal panel 20 accordingly. These voltage changes might cause an unintended display to appear on the second liquid crystal panel 20 which is not being driven. Please be reminded that the opposite electrode is fed with an opposite electrode voltage from, although not shown, an opposite electrode voltage supply circuit.

If the switch section 19 did not repeat temporary switch-on actions while the switch section 19 is switched off (while the second liquid crystal panel 20 is not performing a display operation), the leak current through the switching TFT 17 in the switch section 19 could cause the potential of the source bus line 16 on the second liquid crystal panel 20 to become equal to a mean value of the potential of the source bus line 16 on the first liquid crystal panel 10 which is currently performing a display operation. The mean value of the electrical potential might slightly differ from one source bus line 16 to the other depending on the display image produced on the first liquid crystal panel 10. In such a case, the potential differences across the pixel electrodes and the opposite electrode on the second liquid crystal panel 20 would become non-uniform, resulting in the display screen of the second liquid crystal panel 20 appearing visually undesirable.

These problems are solved by the liquid crystal display 1: the switch section 19 is briefly and repeatedly switched on ("recursive temporary switch-on actions"), for example, at a regular cycle, while producing a display on the first liquid crystal panel 10, but not on the second liquid crystal panel 20. The actions retain the source bus lines 16 on the second liquid crystal panel 20 at a predetermined potential.

Figure 6:
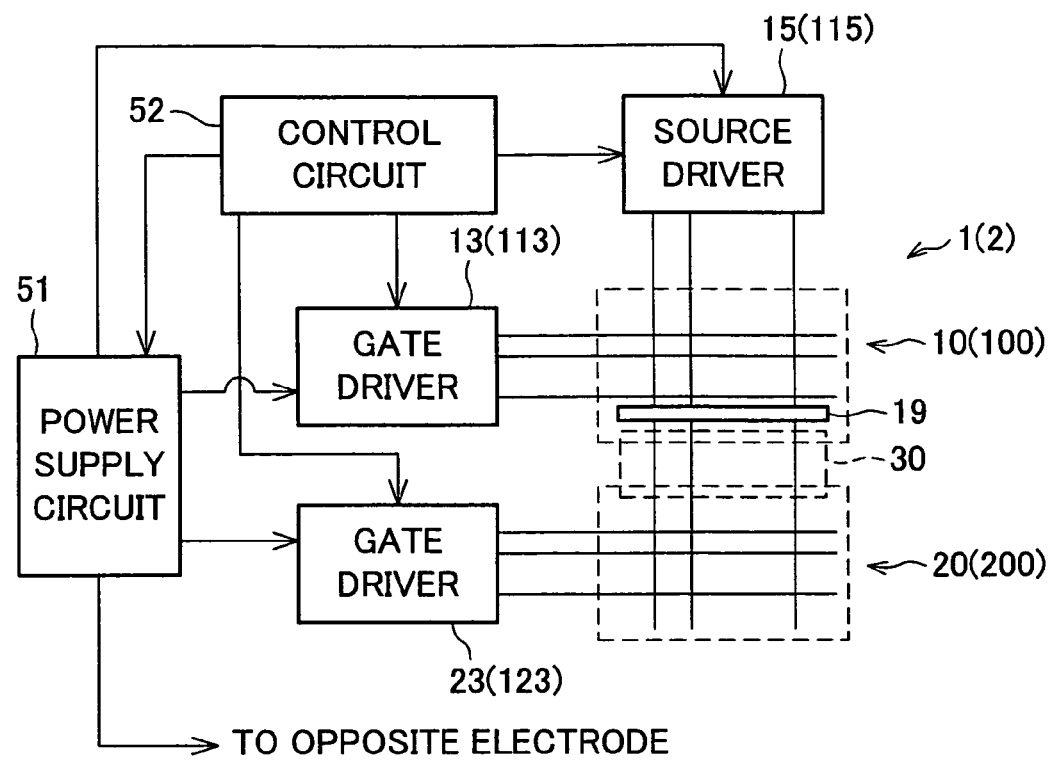
FIG. 6 is a block diagram illustrating the structure of the FIG. 1 display.

FIG. 6 is a block diagram illustrating an arrangement of the liquid crystal display 1 carrying out the actions. The source driver 15 and the gate drivers 13, 23 are fed with necessary voltages from the power supply circuit 51. The source driver 15 and the gate drivers 13, 23 operate under control of the control circuit (control means) 52.

Figure 7:
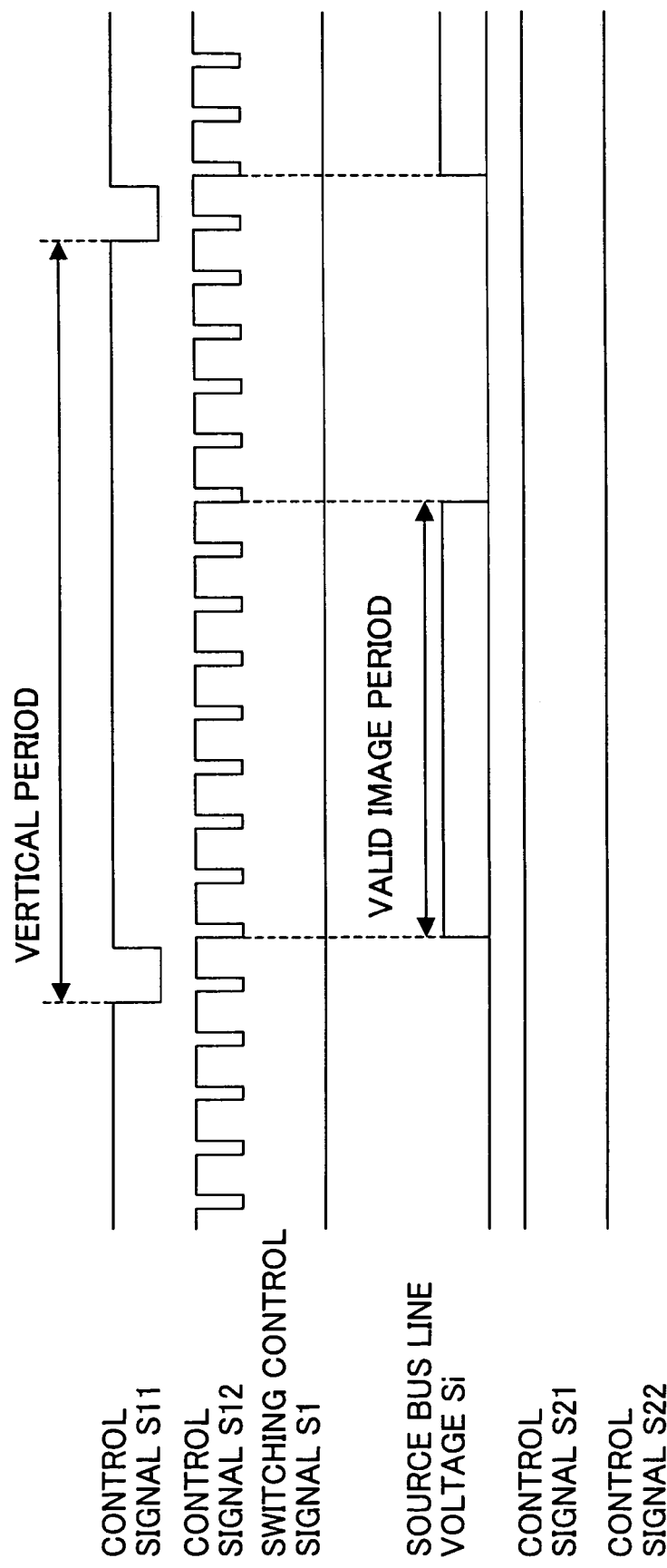
FIG. 7 is a timing chart illustrating output signals of a source driver in the FIG. 1 display when the first liquid crystal panel produces a display whereas the second liquid crystal panel does not. The switch section in the figure is not carrying out recursive temporary switch-on actions.

FIG. 7 is a timing chart illustrating output signals of the source driver 15 when the first liquid crystal panel 10 produces a display whereas the second liquid crystal panel 20 does not. The switch section 19 is not carrying out the recursive temporary switch-on actions.

In FIG. 7, the control signal S11 and the control signal S12 are a start signal and a clock signal for the gate driver 13 respectively. The control signal S21 and the control signal S22 are a start signal and a clock signal for the gate driver 23 respectively. The switching control signal S1 is transferred to the switching control signal line 18 so as to control the switch on/off of the switch section 19. The video signal S1 is transferred to the source bus line 16 in accordance with information on an image display to be produced.

In the above case, the switching control signal S1 stays unchanged at L level, keeping the switch section 19 switched off. The control signal S21 and the control signal S22 both stay unchanged at H level, resulting in the second liquid crystal panel 20 producing no scan signals. As to the video signal S1, each period which is equivalent to the number of the gate bus lines 14 on the first liquid crystal panel 10 is a valid image period; the rest is invalid periods. The potentials of the source bus lines 16 during invalid periods are not particularly specified.

Figure 8:
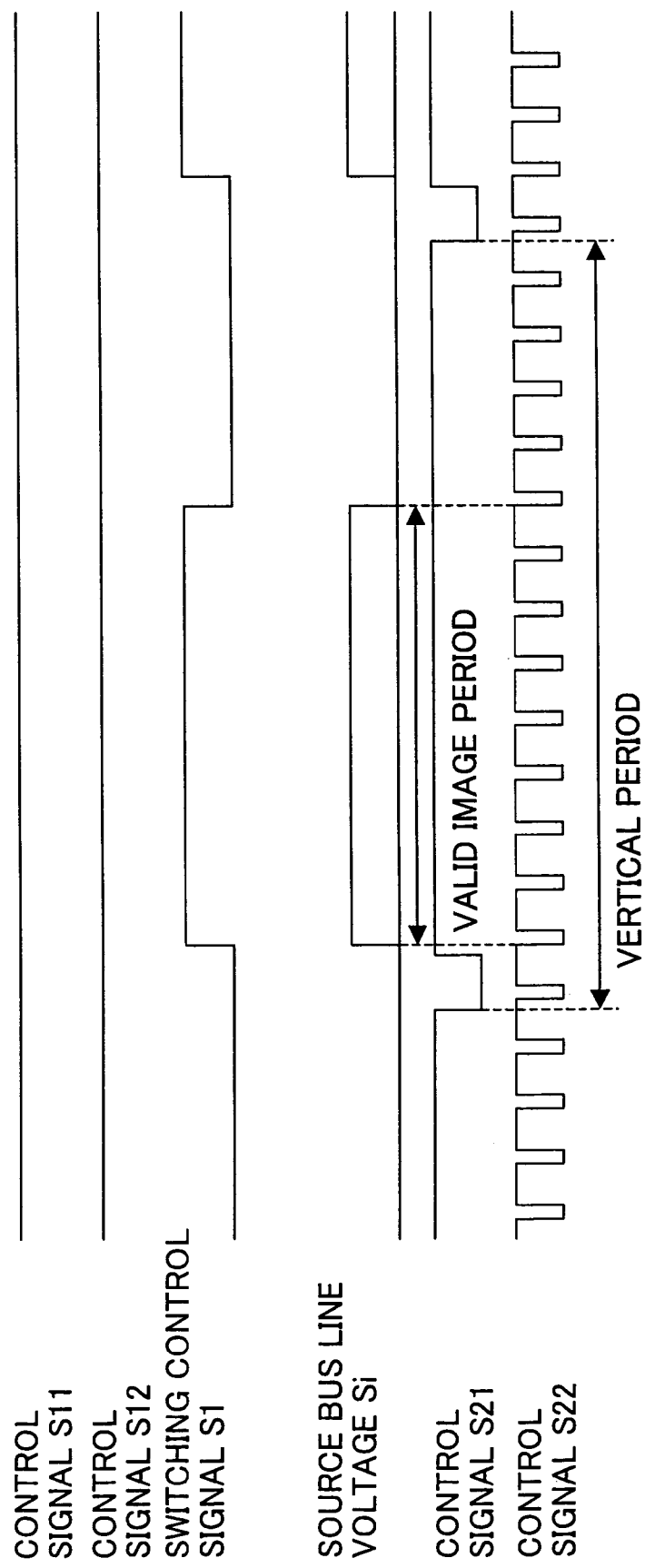
FIG. 8 is a timing chart illustrating output signals of a source driver in the FIG. 1 display when the second liquid crystal panel produces a display whereas the first liquid crystal panel does not.

FIG. 8 is a timing chart illustrating output signals of the source driver 15 when the second liquid crystal panel 20 produces a display whereas the first liquid crystal panel 10 does not. In this situation, the recursive temporary switch-on actions of the switch section 19 has of course no relevance.

Consider the case shown in FIG. 8. During the valid image period, the switching control signal S1 is at H level, keeping the switch section 19 switched on. The control signal S11 and the control signal S12 both stay unchanged at H level, resulting in the first liquid crystal panel 10 producing no scan signals.

Figure 9:
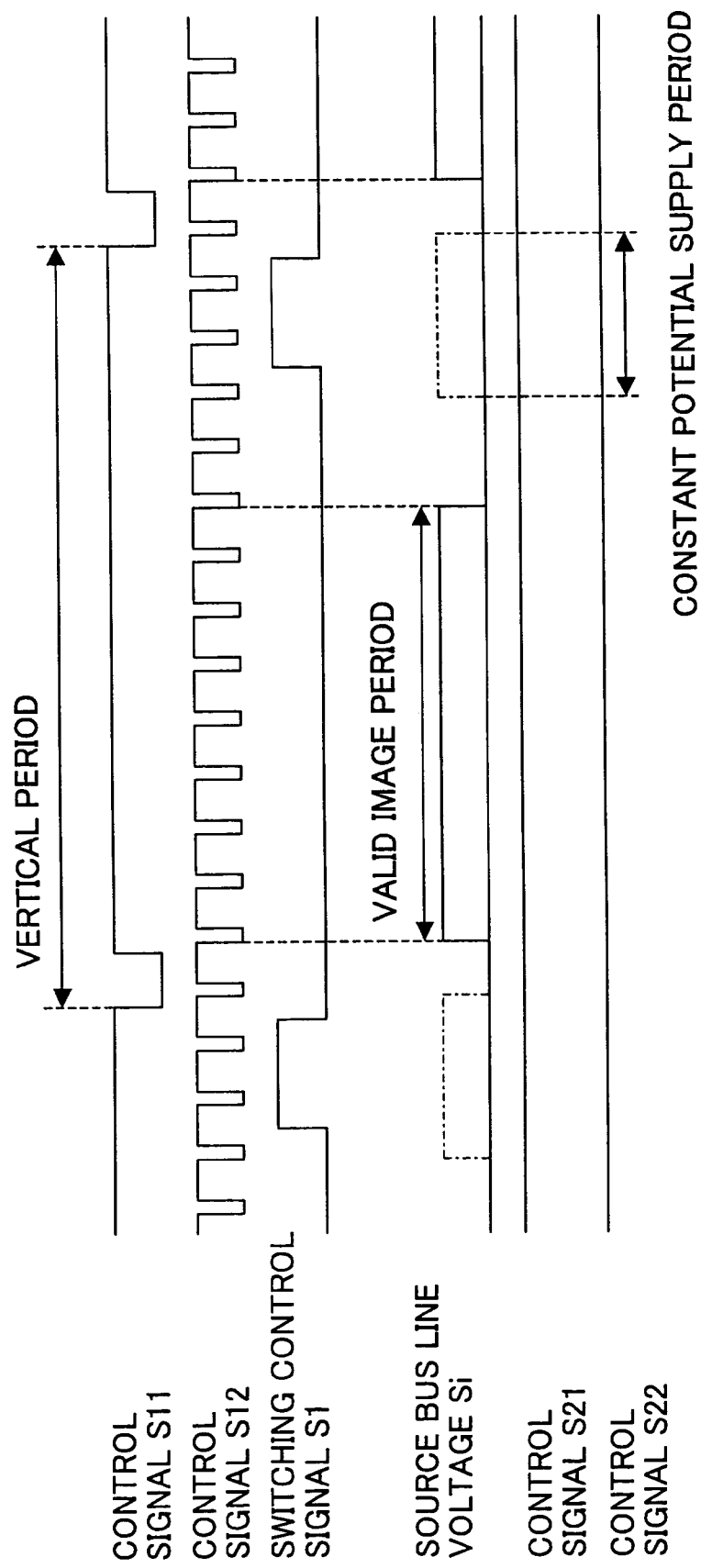
FIG. 9 is a timing chart illustrating output signals of a source driver in the FIG. 1 display when the first liquid crystal panel produces a display whereas the second liquid crystal panel does not. The switch section in the figure is carrying out recursive temporary switch-on actions.

FIG. 9 is a timing chart illustrating output signals of the source driver 15 when the first liquid crystal panel 10 produces a display whereas the second liquid crystal panel 20 does not. The switch section 19 is carrying out the recursive temporary switch-on actions.

In the case, the switching control signal S1 goes to H level briefly outside the valid image period. This leads to a recursive temporary switch-on action of the switch section 19. The signal S1 stays at L level for the rest of time. The video signal S1 stays unchanged at a potential level for a period ("predetermined potential supply period") which stretches at least across that period during which the switching control signal S1 is at H level. The switch section 19 carries out a recursive temporary switch-on action for each vertical interval at a regular cycle outside the valid image period. The control signal S21 and the control signal S22 both stay unchanged at H level, resulting in the second liquid crystal panel 20 producing no scan signals.

This series of actions result in supplying a predetermined potential to the source bus lines 16 on the second liquid crystal panel 20 which is not expected to produce any displays. That is, the potential differences across the opposite electrode and the drains of the TFTs 25, hence the pixel electrodes, are retained at a predetermined level. The appearance of the second liquid crystal panel 20 which is not expected to produce any displays is uniform across the screen and remains unchanged for some time. Unintended displays do not occur.

The recursive temporary switch-on actions of the switch section 19 do not necessarily occur at a regular cycle. They may occur at random intervals, provided that the timings offset voltage variations caused by the leak current or reduce such variations to a level where changes in the appearance of the display screen become unnoticeable. Nevertheless, carrying out one action for each vertical interval or for each integral multiple thereof is preferable in facilitating the control of the recursive temporary switch-on actions of the switch section 19.

There are no particular limitations on the predetermined potential which is supplied to the source bus lines 16 on the second liquid crystal panel 20 as a result of the recursive temporary switch-on actions of the switch section 19. The potential may be of any value provided that it makes the second liquid crystal panel 20 appear uniform (e.g. white, gray, or black) across the screen.

Adopting GND level as the predetermined potential however is preferable because it is easy to do so.

A preferred alternative is to adopt the potential of the opposite electrode as the predetermined potential. When this is the case, there is no potential difference across the opposite electrode and the pixel electrodes. This alternative is preferable for the following advantages: it takes an extended period of time for the leak current to reach a level where resultant potential variations can affect the appearance; the extended period allows for less frequent recursive temporary switch-on actions; and the less frequent actions in turn consumes less power.

In the alternative, the predetermined potential is not necessarily exactly equal to the potential of the opposite electrode. The two potentials can be regarded as being mutually equal if the potential differences across the opposite electrode and the pixel electrodes neither prompt reaction of the liquid crystal nor induce changes in the appearance of the second liquid crystal panel 20. For example, TN mode liquid crystal does not react to the difference between the opposite electrode voltage and the predetermined voltage (pixel electrode voltage) on the source bus lines 16 if the difference is within 1 volt (within ±1 volt). The appearance of the display screen does not change. Other modes have other thresholds for the potential difference; a feasible range of the potential needs be selected in accordance with a particular mode.

The predetermined potential may be equal to the mean value of the voltage on the source bus line 16 on the first liquid crystal panel 10 which is being driven. This mean value refers to the voltage level reached by the voltage on the source bus line 16 on the second liquid crystal panel 20 due to the leak current if the switch section 19 does not carry out the recursive temporary switch-on actions as described earlier. Therefore, supplying the mean voltage to the source bus lines 16 on the second liquid crystal panel 20 allows for reductions in power dissipation caused by the leak current. The predetermined potential is obtainable with, for example, liquid crystal displays, because the source bus line 16 is fed with an AC voltage of a cycle, and the mean value of the AC voltage is known. For example, in AC drive where displays are produced while alternating the polarity of the voltage on the source bus line 16 as is the case with liquid crystal displays, basically, an AC intermediate voltage may be safely regarded as the mean value of the voltage. In DC drive, the mean value of voltage is obtainable, for example, through computation based on input data signals (adding up the data and dividing the sum by the number of lines). These approaches are mere examples. There are many other approaches to obtain the mean voltage value. Any of them may be used.

Furthermore, the predetermined voltage may be, for example, equal to one of the voltages, supplied from the power supply circuit 51 to the source driver 15, which is the closest to the mean voltage value.

This alternative allows for reductions in the power consumed by the liquid crystal display 1. If there is provided a separate circuit which gives an accurate mean voltage value, the circuit consumes power. In contrast, power consumption is reduced if the existing power supply circuit 51 is utilized to obtain one of its output voltages which is the closest to the mean voltage value as the predetermined voltage.

To apply the predetermined voltage (the closest voltage to the mean voltage) via the switch section 19 (switching TFTs 17) from the source bus lines 16 on the first liquid crystal panel 10 to the source bus lines 16 on the second liquid crystal panel 20 as described in the foregoing, it is preferred to apply the predetermined voltage further to the opposite electrode (COM) 27 on the second liquid crystal panel 20. The structure readily offsets the potential differences across the pixel electrodes and the opposite electrode.

The range of the closest voltage to the mean voltage is, for example, such that the effects of the leak current are not clearly visible across the display screen of the second liquid crystal panel 20. For example, in TN mode, this condition is met if the predetermined voltage (pixel electrode voltage) applied to the source bus lines 16 differs from the opposite electrode voltage by 1 volt or less. If a potential difference across the pixel electrodes and the opposite electrode is 1 volt or less (±1 volt or less), liquid crystal in TN mode does not react to the potential difference, causing no changes in appearance. Other modes have other thresholds for the potential difference; a feasible range of the potential needs be selected in accordance with a particular mode.

The potential of the gate bus lines 24 is of less importance than the potential of the source bus lines 16 in preventing the leak current from causing an unintended display on the second liquid crystal panel 20 when the panel 20 is not expected to produce any displays. However, if there is such a large potential difference between the gate bus lines 24 and the opposite electrode that the effects of this potential difference can be seen on the second liquid crystal panel 20, the potential of the gate bus lines 24 can be controlled similarly to the source bus lines 16 so that the potential of the gate bus lines 24 is close to that of the source bus lines 16. To achieve this, the gate driver 23 needs to place the gate bus lines 24 at the same potential as the source bus lines 16, while the predetermined potential is being applied to the source bus lines 16 through the recursive temporary switch-on actions of the switch section 19. This prevents a situation where the potential difference between the gate bus lines 24 and the opposite electrode causes an unintended display near the gate bus lines 24, and an uniform appearance is not obtainable across the screen. For the potential at which the gate bus lines 24, as well as the source bus lines 16, are placed, a similar tolerance range may be specified in accordance with TN or other mode as with the potential applied to the source bus lines 16.

The structure where the gate driver 23 applies the predetermined potential to the gate bus lines 24 may be as follows. The gate driver 23 switches its outputs between ON and OFF voltages through the switches in ordinary display operation. Accordingly, the predetermined potential may be supplied as either the ON or OFF voltages with the gate driver 23 switching the outputs between the voltages through the switches.

Embodiment 2

The following will describe another embodiment of the present invention in reference to drawings.

Figure 10:
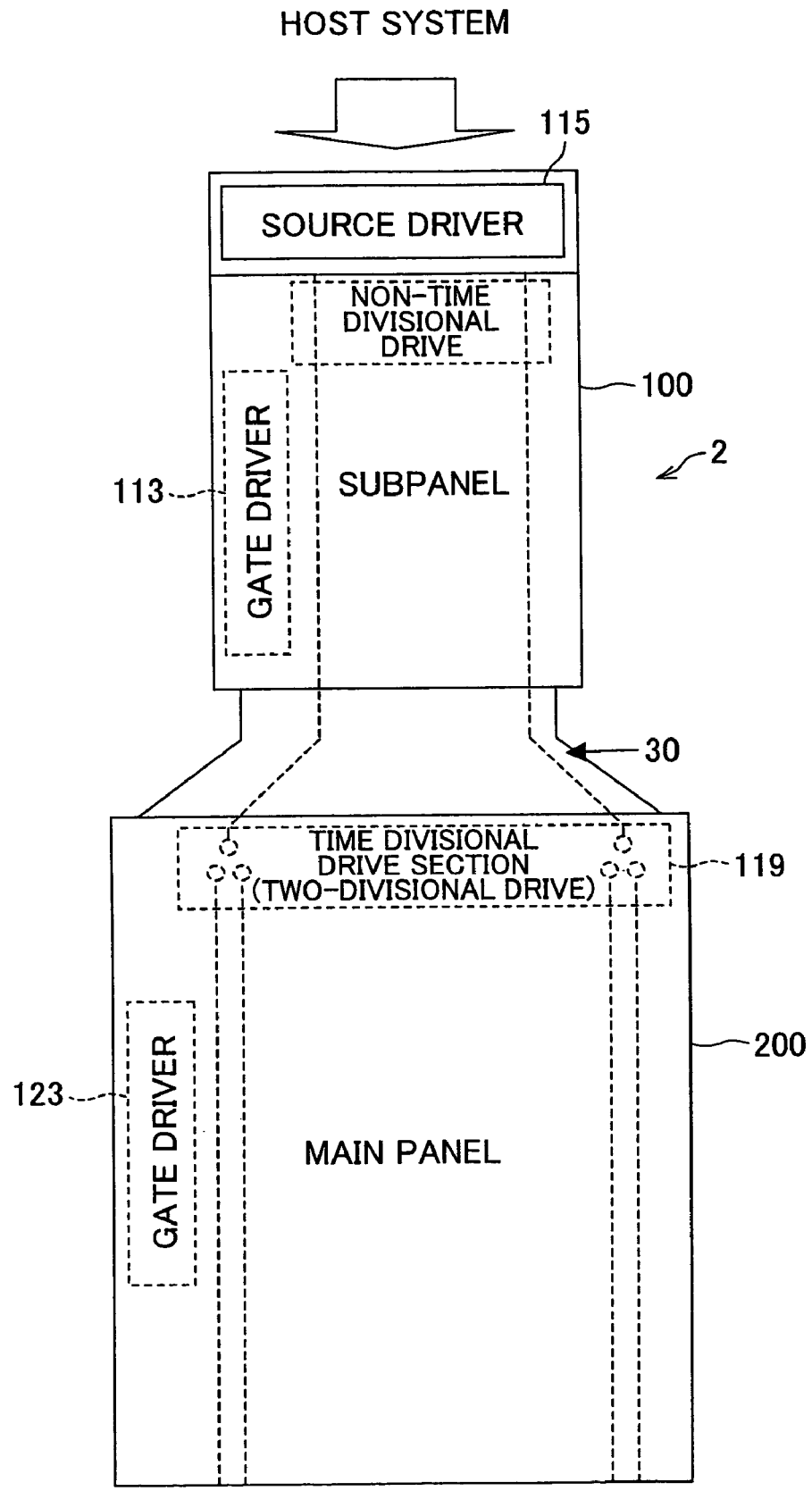
FIG. 10 a schematic front view illustrating the structure of a display in accordance with another embodiment of the present invention.

A liquid crystal display (display) 2 of the present embodiment has a structure as in FIG. 10. That is, the liquid crystal display 2 has a dual panel structure: a subpanel (first display means) 100 and a main panel (second display means) 200. The subpanel 100 and the main panel 200 are active matrix panels. The subpanel 100 and the main panel 200 include dedicated gate drivers 113, 123 respectively to drive gate bus lines. The subpanel 100 and the main panel 200 also include a common source driver (source signal line drive circuit, predetermined potential supply means) 115 to drive source bus lines.

The outputs of the source driver 115, or display data signals, are fed to the source bus lines on the main panel 200 through the source bus lines on the subpanel 100. The source bus lines on the subpanel 100 are connected to the source bus lines on the main panel 200, for example, through a FPC board 30 which is an example of a flexible connect member interposed between the panels.

The main panel 200 has more pixels and higher resolution than the subpanel 100. Therefore, the main panel 200 has more source bus lines than the subpanel 100. To this end, in the liquid crystal display 2, each source bus line on the subpanel 100 corresponds to more than one source bus line on the main panel 200. In other words, in the liquid crystal display 2, a display data signal on each source bus line on the subpanel 100 goes through the time divisional drive section 119 before being transferred to more than one (e.g. two in FIG. 10) source bus lines on the main panel 200. Specifically, the time divisional drive section 119 is built around selectors. The selector switches a display data signal on a source bus line on the subpanel 100 between more than one corresponding source bus lines on the main panel 200 by time division.

Thus, the source driver 115 provided on the subpanel 100 with fewer pixels drives the subpanel 100 by ordinary drive (non-time division drive) and the main panel 200 with more pixels by time division drive. This enables higher resolution displays on the main panel 200 than on the subpanel 100.

Figure 11:
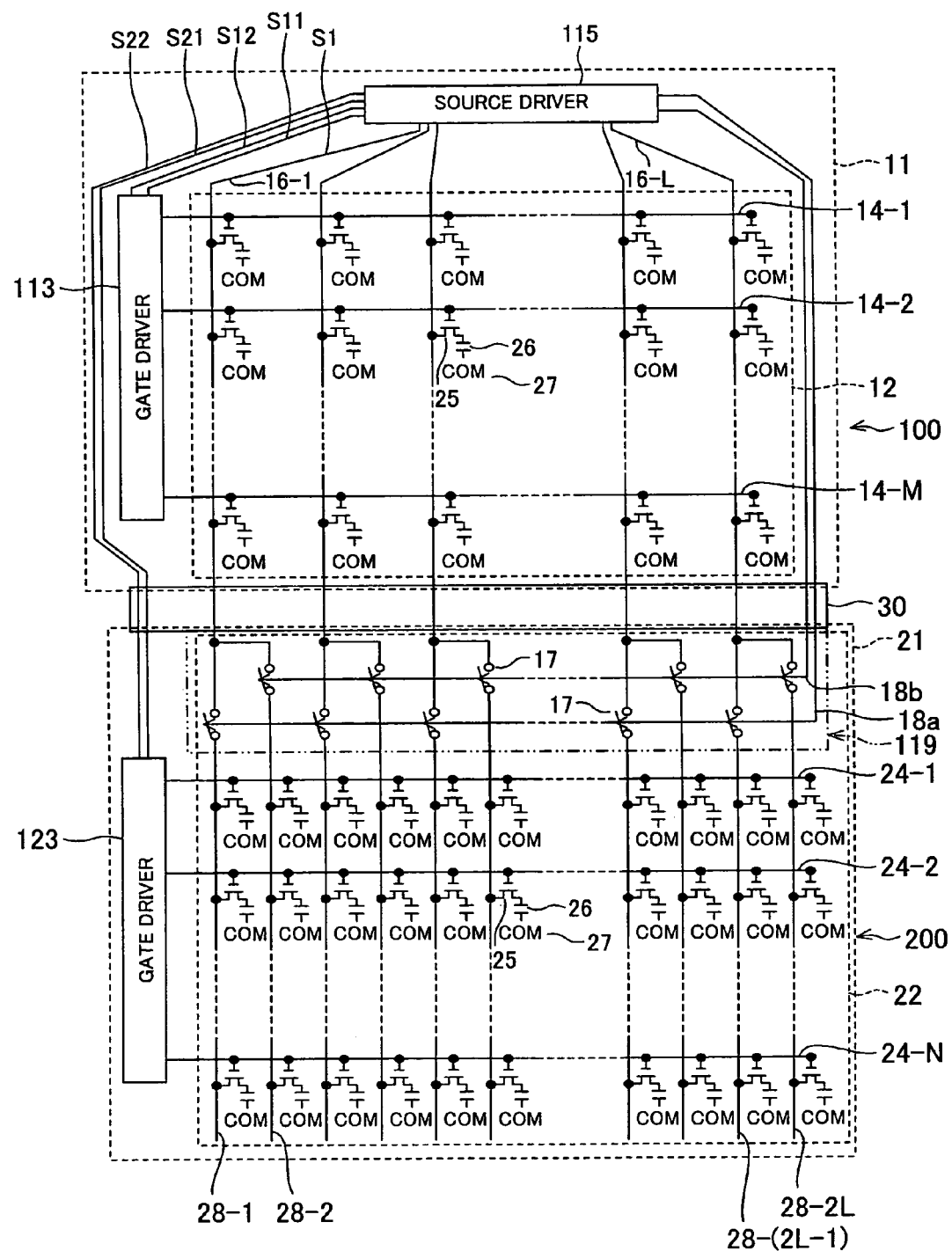
FIG. 11 is a circuit diagram illustrating the structure of the FIG. 10 display.

FIG. 11 is a circuit diagram of the FIG. 10 liquid crystal display 2.

In the liquid crystal display 2, the subpanel 100 includes a TFT substrate 11 carrying TFTs 25 thereon, an opposite substrate 12, and liquid crystal capacitors 26 containing a liquid crystal layer, similarly to the first liquid crystal panel 10. On the TFT substrate 11 are there provided gate bus lines 14, source bus lines 16, and the TFTs 25. The TFTs 25 apply voltage to the liquid crystal capacitors 26 which make up part of the pixels between pixel electrodes and an opposite electrode (COM) 27 provided on the opposite substrate 12.

The main panel 200 includes a TFT substrate 21 carrying TFTs 25 thereon, an opposite substrate 22, and liquid crystal capacitors 26 containing a liquid crystal layer, similarly to the second liquid crystal panel 20. On the TFT substrate 21 are there provided gate bus lines 24, source bus lines 28, and the TFTs 25. The TFTs 25 apply voltage to the liquid crystal capacitors 26 which make up part of the pixels between pixel electrodes and an opposite electrode (COM) 27 provided on the opposite substrate 22.

In the liquid crystal display 2 of the present embodiment, the time divisional drive section 119 is disposed on the main panel 200. The time divisional drive section 119 includes multiple switching TFTs 17, one for each source bus line 28 on the main panel 200. The switching TFT 17 is disposed at an end of the source bus line 28 facing the subpanel 100.

In the liquid crystal display 2, a display data signal on each one source bus line 16 on the subpanel 100 is transferred, for example, to two source bus lines 28 on main panel 200 by time division. Every two adjacent switching TFTs 17 are paired up. Current can be conducted from each source bus line 16 to the associated two source bus lines 28 through the pair of switching TFTs 17 which connects the bus lines 16, 28.

In addition, the time divisional drive section 119 includes a first switching control signal line 18a and a second switching control signal line 18b. The line 18a is connected to the gate of a first switching TFT 17 of each pair. The line 18b is connected to the gate of a second switching TFT 17 of each pair. The first and second switching control signal lines 18a, 18b are fed with a switching control signal to drive the switching TFTs 17 by time division. The drive of the switching TFT 17 connects the two source bus lines 28 to the associated source bus line 16 by time division.

Also, the time divisional drive section 119 is able to electrically separate the subpanel 100 (the source bus lines 16 on the subpanel 100) from the main panel 200 (the source bus lines 28 on the main panel 200).

It is preferable to place the time divisional drive section 119 on the main panel 200, for example, for better wiring efficiency. This does not however forbid alternatives: the section 119 may be placed, for example, on the subpanel 100 or between the subpanel 100 and the main panel 200.

The subpanel 100 is used to show the time, current state of the device, and other basic information, for example, in a device to which the subpanel 100 is applied. The main panel 200 is used to show information in more detail (detailed information) than the information displayed on the subpanel 100. The display operation of the panel 200 is triggered by a user input.

Specifically, in a foldable mobile phone 40, a cover section 42 is formed so that it can open/close on the main body section 41 as shown in FIGS. 2(a), 2(b), for example. The subpanel 100 is provided on a face of the cover section 42 which comes outside when the phone 40 is folded. The main panel 200 is provided on a face of the cover section 42 which comes inside when the phone 40 is folded. Refer back to FIG. 3 for a vertical cross-sectional view of a major part of the cover section 42 constructed in this manner. As shown in the figure, the subpanel 100 and the main panel 200 are disposed back to back inside the cover section 42.

As described in the foregoing, in the liquid crystal display 2, the source driver 115 is provided on the lower resolution subpanel 100 to drive the two display panels (subpanel 100 and main panel 200) singly (by the source driver 115). The time divisional drive section 119 drives the main panel 200 by time division. In addition, the two display panels (subpanel 100 and main panel 200) can be separated.

The cover section 42 is open while, for example, the user is speaking over the mobile phone 40, sending an email, or reading a received email on the mobile phone 40. In these events, the display operation of the subpanel 100 is turned off, whereas the display operation of the main panel 200 is turned on. In contrast, when the mobile phone 40 is either standing by or not being used with the cover section 42 closed, the display operation of the subpanel 100 is turned on, whereas the display operation of the main panel 200 is turned off. Generally, the cover section 42 of the mobile phone 40 is closed longer than it is open, for example, during a 24 hour period. The result is the subpanel 100 producing displays more frequently than the main panel 200.

In the liquid crystal display 2, when the cover section 42 is closed, only the display operation of the subpanel 100 is turned on; the display operation of the main panel 200 is turned off. In this situation, all the switching TFTs 17 in the time divisional drive section 119 are turned off by the switching control signal from the source driver 115. The source bus lines 28 on the main panel 200 are not fed with the display data signal from the source driver 115. The gate driver 113 keeps operating; on the other hand, the gate driver 123 stops operating.

In contrast, when the cover section 42 is open, only the display operation of the main panel 200 is turned on; the display operation of the subpanel 100 is turned off. In this situation, the switching TFTs 17 in the time divisional drive section 119 operate in accordance with the switching control signal from the source driver 115. The TFTs 17 thus transfers the display data signal from the source driver 115 to the source bus lines 28 on the main panel 200. The gate driver 113 stops operating; on the other hand, the gate driver 123 keeps operating.

Next, the display operation of the subpanel 100 and the main panel 200 will be described in more detail.

Figure 12:
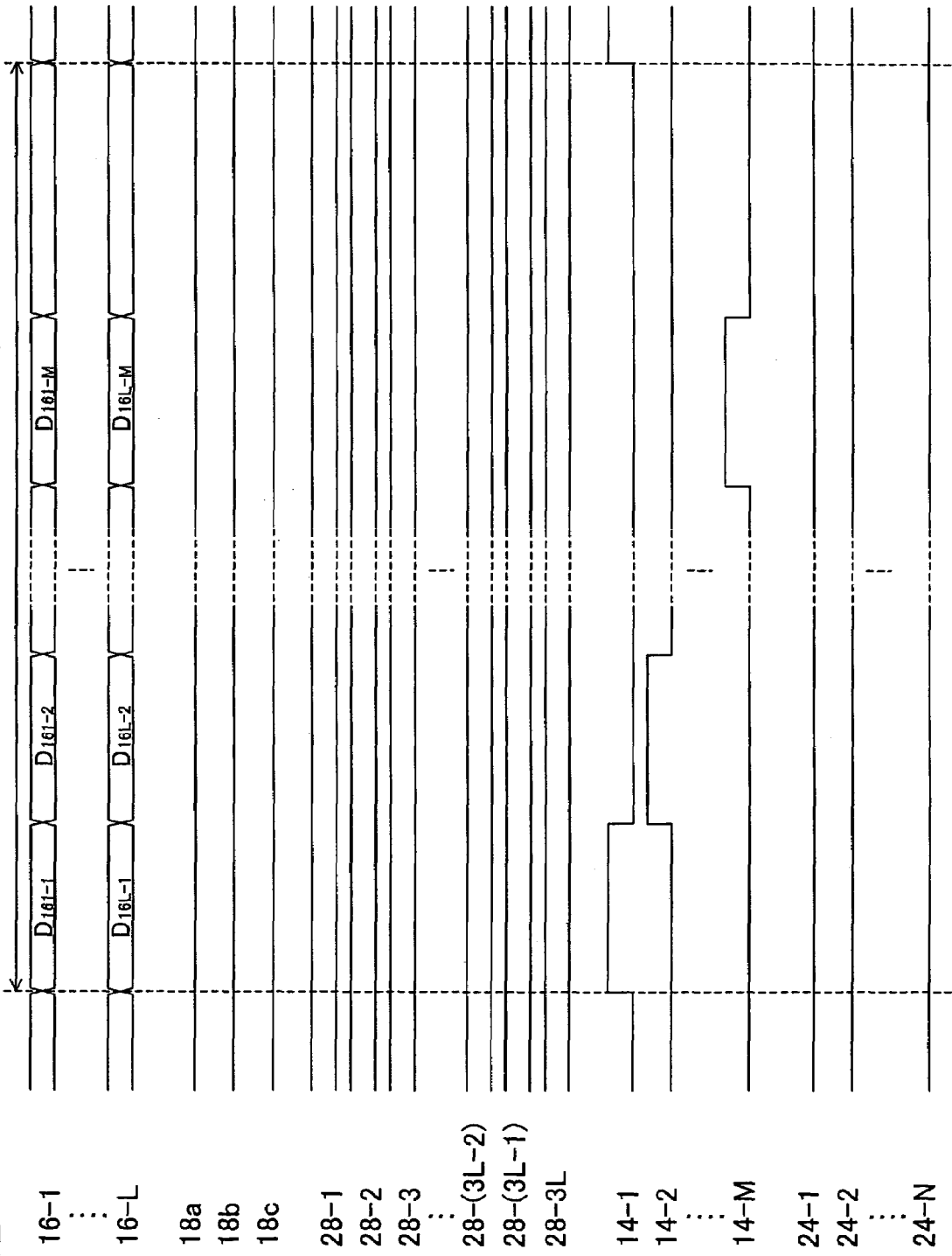
FIG. 12 is a timing chart illustrating an operation of a subpanel in the FIG. 11 display to produce a display.

To produce a display on the subpanel 100, as shown in FIG. 12, the source driver 115 feeds the source bus lines 16 with the display data signals. Further, the gate driver 113 feeds the gate bus lines 14 with the gate signals switching on/off the TFTs 25. In this situation, voltage goes HIGH on a gate bus lines 14, switching on the TFT 25 connected to that gate bus line 14. The display data signal on the source bus line 16 is written to the pixel (liquid crystal capacitor 26).

To produce a display on the subpanel 100, the gate bus lines 14-1 to 14-M are addressed a line at a time, while the source bus lines 16-1 to 16-L are being fed with the display data signals. This series of actions produces a frame. The series is repeated.

In this situation, the main panel 200 produces no displays. So, LOW voltage is applied from the source driver 115 to the first and second switching control signal lines 18a, 18b. This turns off all the switching TFTs 17 in the time divisional drive section 119 and electrically isolates the source bus lines 28-1 to 28-2L on the main panel 200. In addition, the gate bus lines 24-1 to 24-N on the main panel 200 are not driven either.

In the above operation, the load in the higher resolution main panel 200 is electrically isolated when producing a display on the lower resolution subpanel 100. Therefore, the liquid crystal display 2 achieves lower power consumption.

Figure 13:
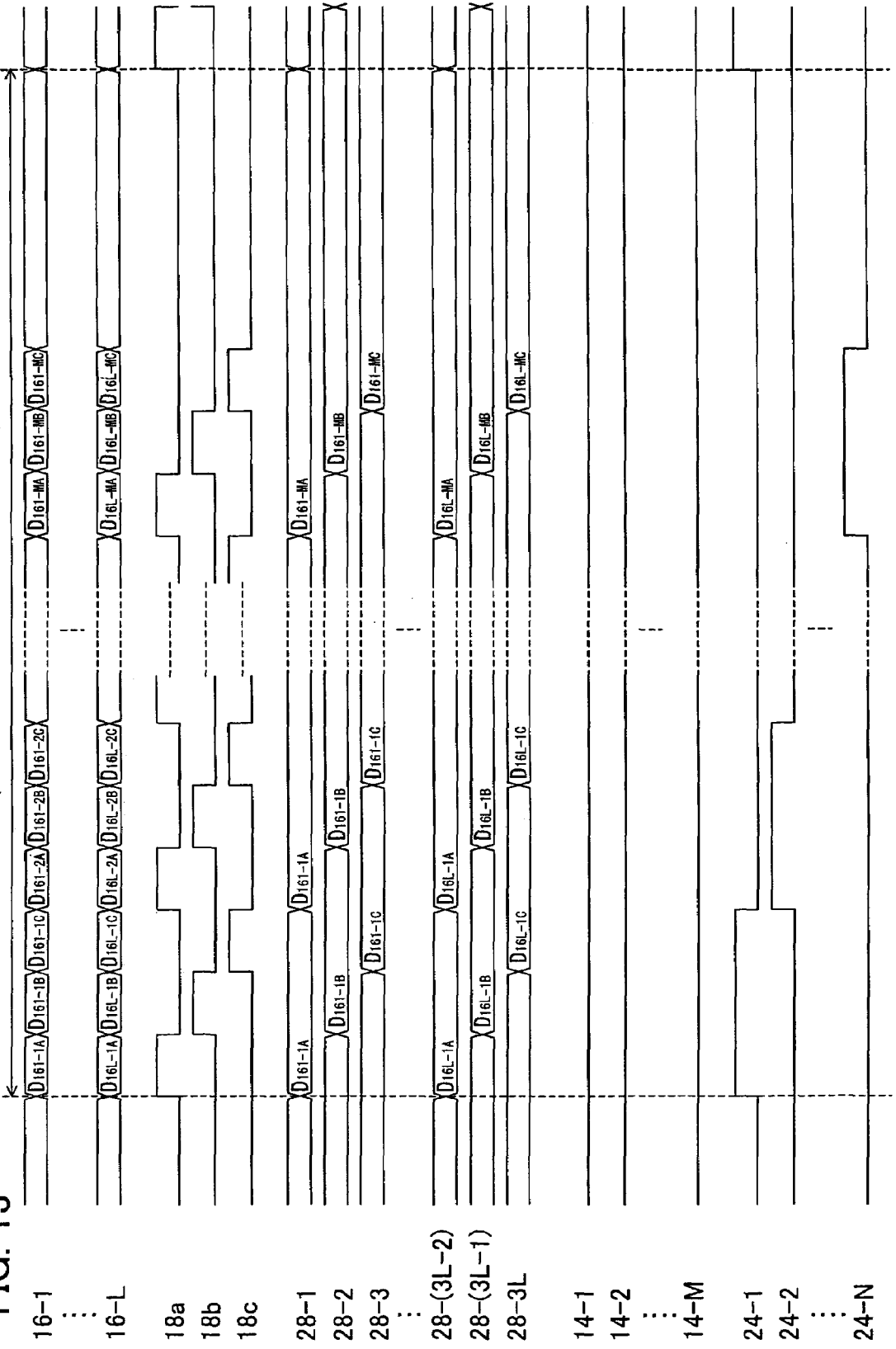
FIG. 13 is a timing chart illustrating an operation of a main panel in the FIG. 11 display to produce a display.

In contrast, to produce a display on the main panel 200, the display data signals are applied from the source driver 115 to the source bus lines 16, and the gate signals are applied from the gate driver 123 to the gate bus lines 24 to switch on/off the TFTs 25, as shown in FIG. 13. In this situation, as voltage on a gate bus line 24 goes HIGH, the TFT 25 connected to that gate bus line 24 is turned on. The display data signal on the source bus line 16 is written to the pixel (liquid crystal capacitor 26).

In the liquid crystal display 2, the display data signals from the source driver 115 are transferred to the source bus lines 28 on the higher resolution main panel 200 through the source bus lines 16 on the lower resolution subpanel 100. This is achieved by driving the higher resolution main panel 200 by time division.

To produce a display on the main panel 200, the gate bus lines 24-1 to 24-N are addressed a line at a time, while the source bus lines 16-1 to 16-L are being fed with the display data signals. This series of actions produces a frame. The series is repeated.

Although the main panel 200 is currently producing no display, the display data signals need be applied to the main panel 200. So, the switch on/off of the switching TFTs 17 in the time divisional drive section 119 is controlled. Specifically, the switch on/off of the switching TFT 17 is controlled by the switching control signal on either the first or second switching control signal line 18a, 18b which is connected to that TFT 17. The display data signal is thus fed to a pair of source bus lines 28, for example, source bus lines 28-1, 28-2, by time division. The gate bus lines 14-1 to 14-M are however not driven.

In the above operation, the load in the lower resolution subpanel 100 cannot be electrically isolated in producing a display on the higher resolution main panel 200, which requires extra electric power. However, in the dual panel structure, applied to the foldable mobile phone 40 or the like, which contains the higher resolution main panel 200 and the lower resolution subpanel 100, generally, the lower resolution subpanel 100 is used for such purposes where display frequency is relatively high, whereas the higher resolution main panel 200 is used for such purposes where display frequency is relatively low. Therefore, the main panel 200 produces a display less frequently in the use of the liquid crystal display 2. The liquid crystal display 2 as a whole achieves reductions in power consumption.

The foregoing loads are primarily due to the capacitance of insulating sections where they cross the gate bus lines 14 and the parasitic capacitance of the TFTs 25, among other factors.

Figure 14:
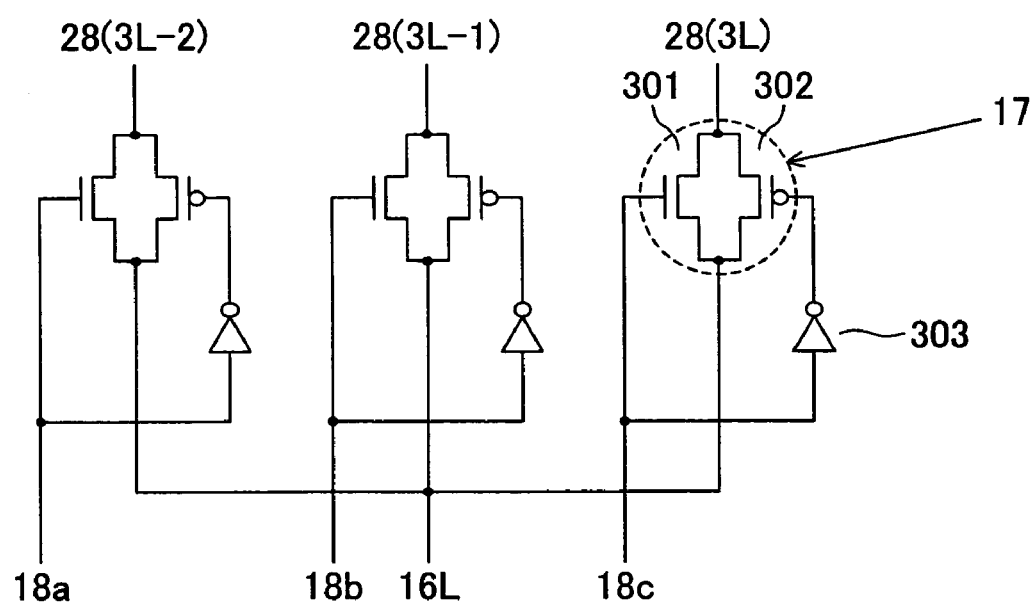
FIG. 14 is a circuit diagram illustrating another example of the FIG. 11 switching TFT.

FIG. 14 shows an alternative structure of the switching TFTs 17 connected to capacitive loads in the foregoing embodiments. Referring to the figure, each switching TFT 17 contains a N-channel MOSFET 301, a P-channel MOSFET 302, and an inverter 303. CMOS structures like this are of course preferred to one-channel structure in terms of accuracy of switching actions. It is also preferred in terms of capability of stable control of voltage levels. There are no problems in switching operation if the switching element is of one-channel type.

In the liquid crystal display 2, resolutions may be assigned freely to the subpanel 100 and the main panel 200 through a suitable number of divisions involved in the time division drive for the main panel 200. In the present embodiment, the main panel 200 is driven by dividing time into two; therefore, the main panel 200 can be have a resolution up to double that of the subpanel 100.

In the liquid crystal display 2, the switching TFTs 17 in the time divisional drive section 119 play two roles: for time division drive and for isolation of the subpanel 100 from the main panel 200. This dual role structure requires fewer components and is simpler as well as less costly than providing dedicated switches for each role.

In the mobile phone 40, the first liquid crystal panel 10 (subpanel 100) carrying the source driver 15 (115), that is, the first liquid crystal panel 10 (subpanel 100) provided on the outside face of the cover section 42, does not have to be structured so that its display operation is turned off when the cover section 42 is open. The panel (subpanel 100) may be structured so that its display operation is always turned on regardless of whether the cover section 42 is open or closed.

The foregoing embodiments assume that the switching TFTs 17 are driven by signals from the source driver 15 or the source driver 115. The TFTs 17 may be driven by another drive circuit.

In the liquid crystal display 2 of the present embodiment, as described in the foregoing, the main panel 200 is isolated from the subpanel 100 by the time divisional drive section 119 when producing a display not on the main panel 200 carrying no source driver 115, but only on the subpanel 100 carrying the source driver 115. The isolation could entail inconveniences in producing a display on the main panel 200 similarly to the liquid crystal display 1.

The resistance value of the switching TFT 17 in the time divisional drive section 119 is at least 1000 times as high when it is switched off as when it is switched on. This does not mean, however, that the switching TFT 17 would absolutely cease conducting on a switch-off: a certain level of leak current could flow. The leak current would gradually move the potential of the source bus line 28 on the main panel 200 which is currently not being driven, until that potential ultimately would become equal to the mean value of the voltage on the source bus line 16 on the subpanel 100 which is being driven. The gradually changing voltage on the source bus line 28 would be applied to the drain of the TFT 25 on the main panel 200, and in turn, to the pixel electrode connected to that drain. Resultant variations in the voltage across the pixel electrode and the opposite electrode could change the appearance of the main panel 200 accordingly. These voltage changes might cause an unintended display to appear on the main panel 200 which is not being drive.

If the time divisional drive section 119 did not repeat temporary switch-on actions while the time divisional drive section 119 is switched off (while the main panel 200 is not performing a display operation), the leak current through the switching TFT 17 in the time divisional drive section 119 could cause the potential of the source bus line 28 on the main panel 200 to become equal to a mean value of the potential of the source bus line 16 on the subpanel 100 which is currently performing a display operation. The mean value of the electrical potential might slightly differ from one source bus line 28 to the other depending on the display image produced on the subpanel 100. In such a case, the potential differences across the pixel electrodes and the opposite electrode on the main panel 200 would become non-uniform, resulting in the display screen of the main panel 200 appearing visually undesirable.

These problems are solved by the liquid crystal display 2: the time divisional drive section 119 is briefly and repeatedly switched on, for example, at a regular cycle, while producing a display on the subpanel 100, but not on the main panel 200. The actions retain the source bus lines 28 on the main panel 200 at a predetermined potential. Refer back to FIG. 6 for an arrangement of the liquid crystal display 2 carrying out the actions.

Figure 15:
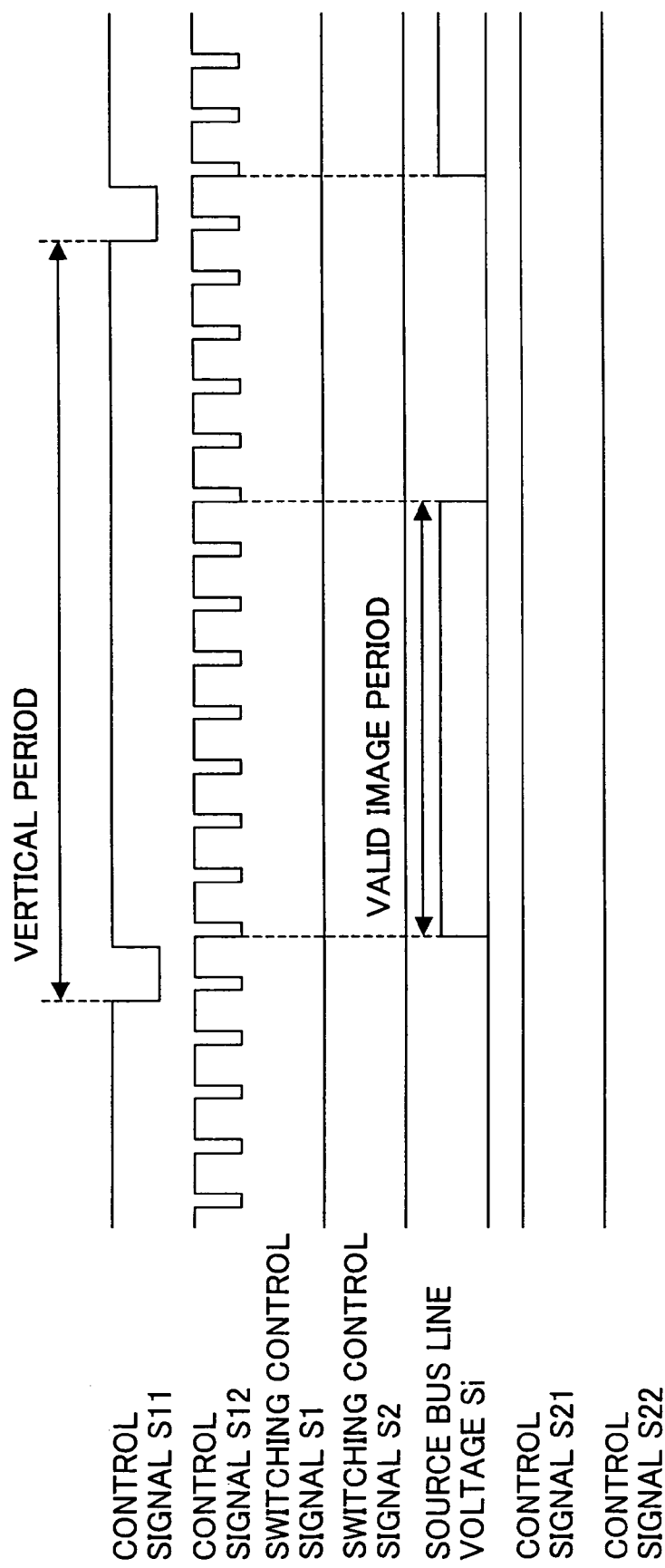
FIG. 15 is a timing chart illustrating output signals of a source driver in the FIG. 11 display when the subpanel produces a display whereas the main panel does not. The switch section in the figure is not carrying out recursive temporary switch-on actions.

FIG. 15 is a timing chart illustrating output signals of the source driver 115 when the subpanel 100 produces a display whereas the main panel 200 does not. The time divisional drive section 119 is not carrying out the recursive temporary switch-on actions.

In FIG. 15, the control signal S11 and the control signal S12 are a start signal and a clock signal for the gate driver 113 respectively. The control signal S21 and the control signal S22 are a start signal and a clock signal for the gate driver 123 respectively. The switching control signals S1, S2 are transferred to the first and second switching control signal lines 18a, 18b respectively so as to control the switch on/off of the switching TFTs 17 in the time divisional drive section 119. The video signal S1 is transferred to the source bus lines 16, 28 in accordance with information on an image display to be produced.

In the above case, the switching control signals S1, S2 both stay unchanged at L level, keeping the time divisional drive section 119 switched off. The control signal S21 and the control signal S22 both stay unchanged at H level, resulting in the main panel 200 producing no scan signals. As to the video signals S1, each period which is equivalent to the number of the gate bus lines 14 on the subpanel 100 is a valid image period; the rest is invalid periods. The potentials of the source bus lines 16 during invalid periods are not particularly specified.

Figure 16:
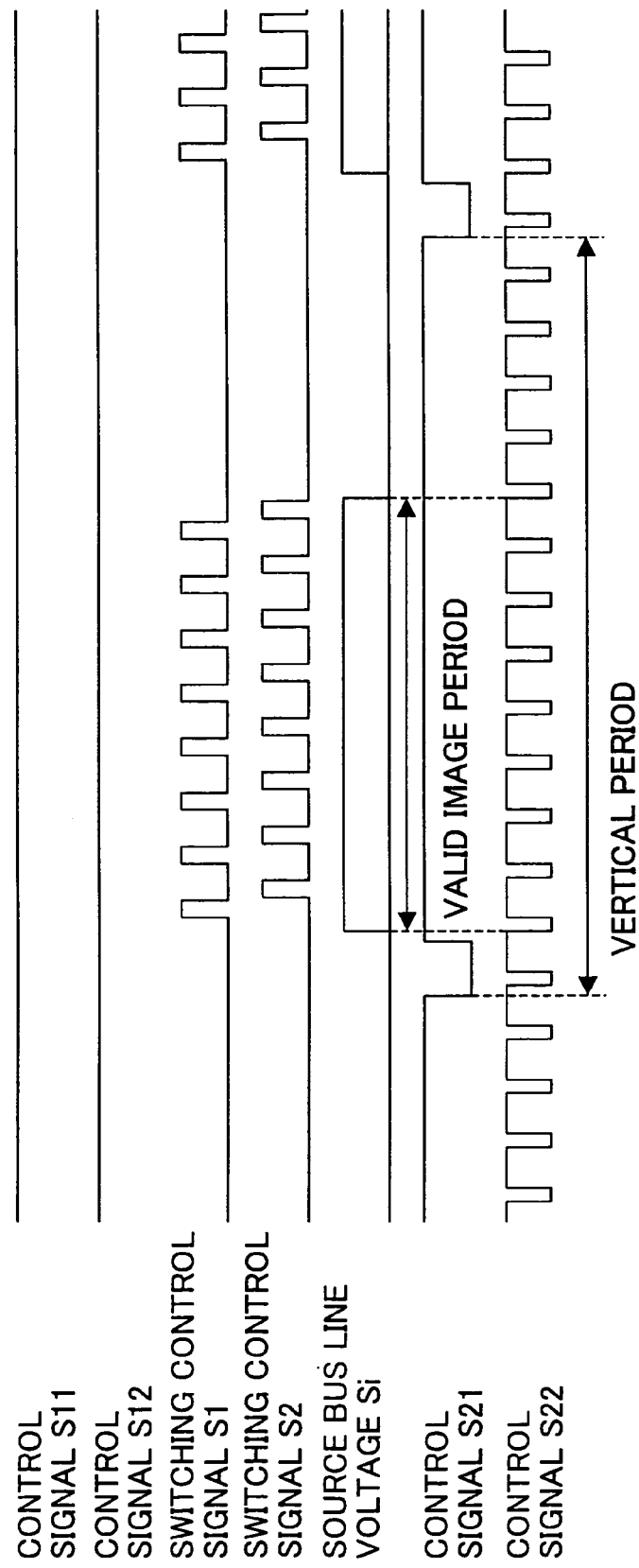
FIG. 16 is a timing chart illustrating output signals of a source driver in the FIG. 11 display when the main panel produces a display whereas the subpanel does not.

FIG. 16 is a timing chart illustrating output signals of the source driver 115 when the main panel 200 produces a display whereas the subpanel 100 does not. In this situation, the recursive temporary switch-on actions of the time divisional drive section 119 has of course no relevance.

Consider the case shown in FIG. 16. During the valid image period, the switching control signals S1, S2 alternately go to H level, switching on/off the switching TFTs 17 in the time divisional drive section 119. The control signal S11 and the control signal S12 both stay unchanged at H level, resulting in the subpanel 100 producing no scan signals.

Figure 17:
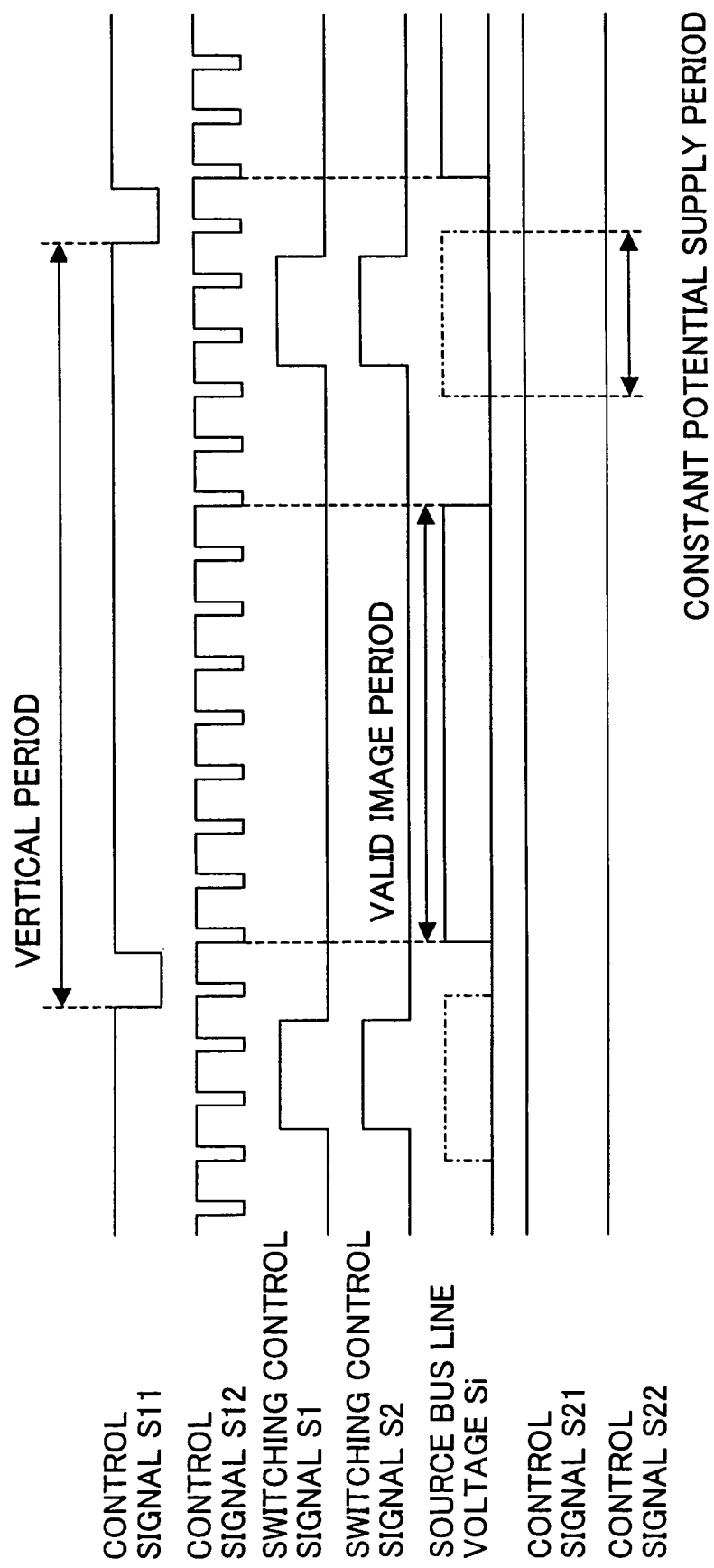
FIG. 17 is a timing chart illustrating output signals of a source driver in the FIG. 11 display when the subpanel produces a display whereas the main panel does not. The switch section in the figure is carrying out recursive temporary switch-on actions.
Figure 18:
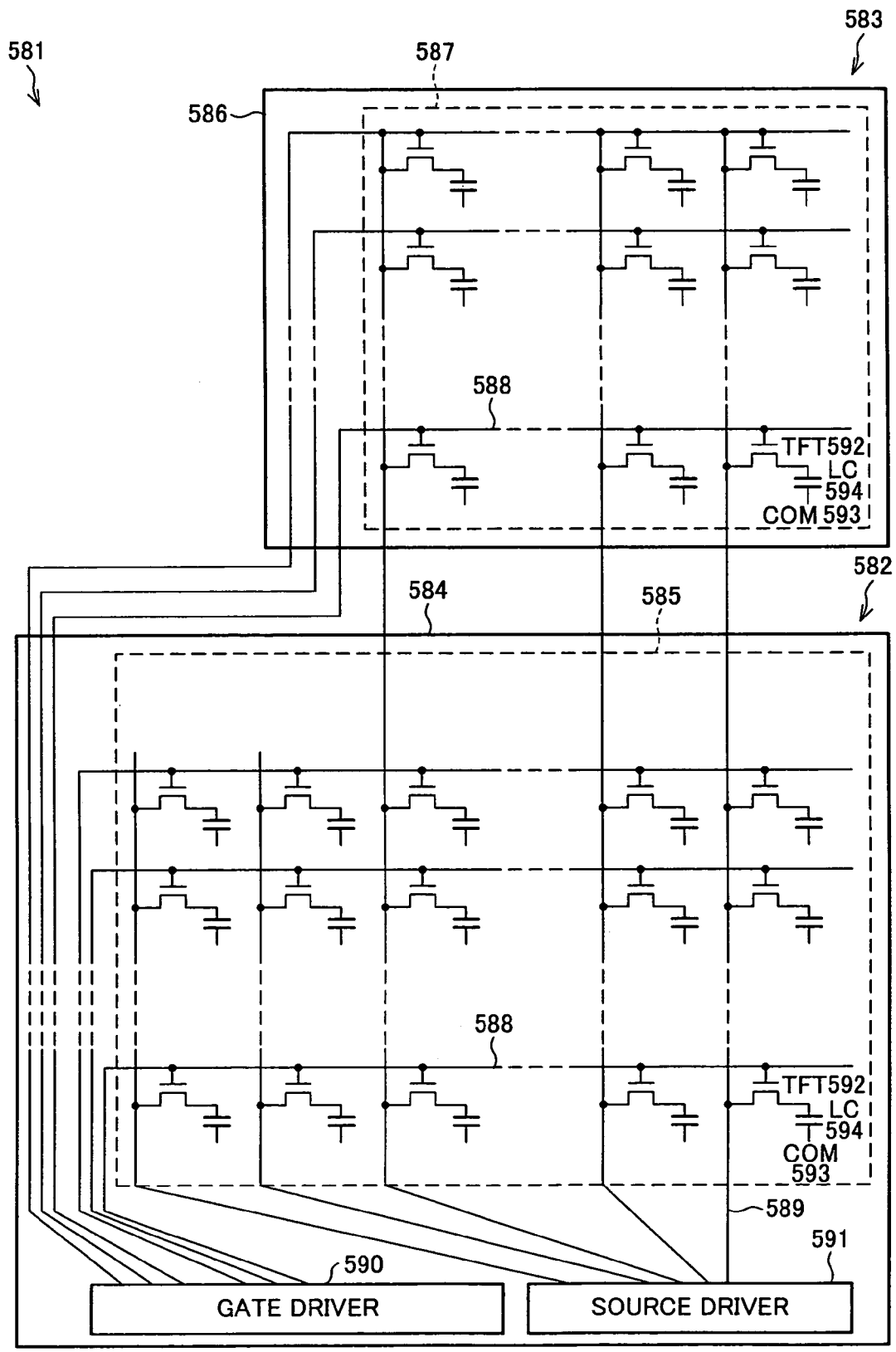
FIG. 18 is a circuit diagram illustrating a display with a conventional dual panel structure.

In contrast, FIG. 17 is a timing chart illustrating output signals of the source driver 115 when the subpanel 100 produces a display whereas the main panel does not. The time divisional drive section 119 is carrying out the recursive temporary switch-on actions.

In the case shown in FIG. 17, the switching control signals S1, S2 both go to H level briefly outside the valid image period. This leads to a recursive temporary switch-on action of the time divisional drive section 119. The signals S1, S2 stay at L level for the rest of time. The video signal S1 stays unchanged at a potential level for a period ("predetermined potential supply period") which stretches at least across that period during which the switching control signals S1, S2 are at H level. The time divisional drive section 119 carries out a recursive temporary switch-on action for each vertical interval at a regular cycle outside the valid image period. The control signal S21 and the control signal S22 both stay unchanged at H level, resulting in the main panel 200 producing no scan signals.

This series of actions result in supplying a predetermined potential to the source bus lines 116 on the main panel 200 which is not expected to produce any displays. That is, the potential differences across the opposite electrode and the drains of the TFTs 25, hence the pixel electrodes, are retained at a predetermined level. The appearance of the main panel 200 which is not expected to produce any displays is uniform across the screen and remains unchanged for some time. Unintended displays do not occur.

The recursive temporary switch-on actions of the time divisional drive section 119 do not necessarily occur at a regular cycle, as is the case with the liquid crystal display 1. Nevertheless, carrying out one action for each vertical interval or for each integral multiple thereof is preferable in facilitating the control of the recursive temporary switch-on actions of the time divisional drive section 119, as is the case again with the liquid crystal display 1.

There are no particular limitations on the predetermined potential which is supplied to the source bus lines 24 on the main panel 200 as a result of the recursive temporary switch-on actions of the time divisional drive section 119. This is again the same case with the liquid crystal display 1. The predetermined potential may be selected from the electrical potentials described in relation to the liquid crystal display 1.

The potential of the gate bus lines 24 may be preferably controlled to reduce effects of the potential of the gate bus lines 24, as is the case again with the liquid crystal display 1.

The embodiments and examples described in are for illustrative purposes only and by no means limit the scope of the present invention. Variations are not to be regarded as a departure from the spirit and scope of the invention, and all such modifications as would be obvious to one skilled in the art are intended to be included within the scope of the claims below.

A display of the present invention can be utilized for desktop or non-mobile devices equipped with multiple display sections and operating primarily from an AC power supply. The display is however particularly suitable for mobile devices equipped with multiple display sections and operating from a battery. The battery-dependent operation is a cause for demand for the lowering of power consumption. Examples of such mobile devices include mobile phones and PDAs (personal digital assistants).

As described in the foregoing, the display and its driving method of the present invention may be arranged so that the recursive temporary switch-on actions are carried out at a cycle equal to an integral multiple of a vertical interval for the second display means.

The arrangement facilitates the control of the recursive temporary switch-on actions.

The display and its driving method of the present invention may be arranged so that the predetermined potential is equal to a potential of an opposite electrode of the second display means.

According to the arrangement, in the second display means carrying out no display operation, in rendering the potential differences between the pixel electrodes and the opposite electrode equal to a predetermined level, the potential differences between the pixel electrodes and the opposite electrode hardly occur, and it takes time for the potential variations caused by leak current to reach a level where the leak current would affect displaying. Therefore, it becomes possible to extend the intervals between the recursive temporary switch-on actions. Electric power consumption in the recursive temporary switch-on actions is reduced.

The display and its driving method may be arranged so that the predetermined potential and a potential of an opposite electrode of the second display means are both equal to GND during the recursive temporary switch-on actions.

According to the arrangement, in rendering the potential differences between the pixel electrodes and the opposite electrode equal to a predetermined level in the second display means carrying out no display operation, the potential for that purpose can be readily obtained.

The display and its driving method of the present invention may be arranged so that the predetermined potential is equal to a mean value of potentials of the source signal lines of the first display means carrying out a display operation.

According to the arrangement, in rendering the potential differences between the pixel electrodes and the opposite electrode equal to a predetermined level in the second display means carrying out no display operation, power loss caused by the leak current in the second switching means can be reduced. In other words, the mean value of the potentials, if the recursive temporary switch-on actions were not carried out, would be equal to the value to which the potentials of the source signal lines of the second display means would approach due to the leak current in the second switching means. Therefore, applying the mean value of the potentials to the source signal lines of the second display means reduces power loss caused by the leak current.

The display may be arranged to include a power supply circuit supplying multiple voltages so that the predetermined potential is equal to one of voltages supplied from the power supply circuit to the source signal line drive circuit, the one of voltages being the closest to a mean value of potentials of the source signal lines of the first display means carrying out a display operation.

The method for driving the display may be arranged so that the predetermined potential is equal to one of voltages supplied to the source signal line drive circuit, the one of voltages being the closest to a mean value of potentials of the source signal lines of the first display means carrying out a display operation.

The arrangement offsets the need for a circuit dedicated to supply the mean value of the potentials, reducing power consumption. In other words, if a circuit is separately provided to produce an accurate mean value of the potentials, power consumption occurs in the circuit. In contrast, electric power consumption in driving a separate circuit is lowered by using an existing power supply circuit and utilizing the closest output voltage to the mean value of the potentials which is selected from multiple output voltages from the existing power supply circuit.

The display and display method may be arranged so that the voltage closest to the mean value of the potentials of the source signal lines of the first display means carrying out a display operation, as the predetermined potential, is simultaneously supplied to an opposite electrode of the second display means.

The arrangement readily offsets the potential differences between the pixel electrodes and the opposite electrode and prevents an unintended display from appearing on the second display means carrying out no display operation in an effective manner.

The display and its driving method may be arranged so that the predetermined potential is supplied to the gate signal lines of the second display means during the recursive temporary switch-on actions.

The arrangement prevents unintended display from appearing on the second display means carrying out no display operation in a more effective manner. In other words, when there are large potential differences between the gate signal lines and the opposite electrode, this potential differences may affect the display on the second display means. Accordingly, supplying the predetermined potential (that is, the potential equal to the potential of the opposite electrode, the GND, the mean value of the potentials of the source signal lines of the first display means carrying out a display operation, or the one of the voltages supplied to the source signal line drive circuit which is the closest to the mean value of potentials of the source signal lines of the first display means carrying out a display operation) to the gate signal lines of the second display means during the recursive temporary switch-on actions prevents the potentials of the gate signal lines from affecting the display on the second display means.

The display may be arranged so that the second display means carries out a display operation less frequently than the first display means.

According to the arrangement, the display data signals are supplied to the source signal lines of the second display means which carries out a display operation less frequently through the source signal lines of the first display means which carries out a display operation more frequently. Therefore, during the use of the display device, the source signal lines of the second display means are connected to the source signal lines of the first display means for a reduced period of time, which further lowers power consumption.

The display may be arranged so that the first display means has fewer pixels than the second display means.

According to the arrangement, in a structure containing the first display means with fewer pixels, that is, with a lower resolution, and the second display means with more pixels, that is, with a higher resolution, typically, the first display means with fewer pixels is used to produce displays more frequently. Therefore, the arrangement is preferable in lowering power consumption.

The display may be arranged so that: the first display means and the second display means are provided in a device in which a second housing section opens/closes on a first housing section; the first display means is provided so that when the second housing section is closed on the first housing section, a display plane of the first display means is on an outside face of either the first or second housing section; and the second display means is provided so that when the second housing section is closed on the first housing section, a display plane of the second display means is on an inside face of either the first or second housing section.

According to the arrangement, when a device with a display in which a second housing section opens/closes on a first housing section is being used, the second housing section is often closed on the first housing section. Therefore, the structure where the first display means is provided so that when the second housing section is closed on the first housing section, a display plane of the first display means is on an outside face of either the first or second housing section; and the second display means is provided so that when the second housing section is closed on the first housing section, a display plane of the second display means is on an inside face of either the first or second housing section is preferable in lowering power consumption.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A display, comprising:
   first display means including: gate signal lines; source signal lines; first switching means provided near intersections of the gate signal lines and the source signal lines, control terminals for switching operation of the first switching means being connected to the gate signal lines; and pixel electrodes connected to the source signal lines through the first switching means;
   a source signal line drive circuit provided to the first display means to supply display data signals to the source signal lines;
   second switching means containing semiconductor elements;
   second display means including: the gate signal lines; source signal lines; first switching means; and pixel electrodes, the source signal lines of the second display means being connected to the associated source signal lines of the first display means through the second switching means, the second display means sharing the source signal line drive circuit with the first display means; and predetermined potential supply means briefly and repeatedly supplying a predetermined potential to the source signal lines of the second display means when the second switching means is off.

2. The display as set forth in claim 1, wherein the recursive temporary switch-on actions are carried out at a cycle equal to an integral multiple of a vertical interval for the second display means.

3. The display as set forth in claim 2, wherein the predetermined potential is equal to a potential of an opposite electrode of the second display means.

4. The display as set forth in claim 3, wherein the predetermined potential is supplied to the gate signal lines of the second display means during the recursive temporary switch-on actions.

5. The display as set forth in claim 2, wherein the predetermined potential and a potential of an opposite electrode of the second display means are both equal to GND during the recursive temporary switch-on actions.

6. The display as set forth in claim 5, wherein the predetermined potential is supplied to the gate signal lines of the second display means during the recursive temporary switch-on actions.

7. The display as set forth in claim 2, wherein the predetermined potential is equal to a mean value of potentials of the source signal lines of the first display means carrying out a display operation.

8. The display as set forth in claim 7, wherein the predetermined potential is supplied to the gate signal lines of the second display means during the recursive temporary switch-on actions.

9. The display as set forth in claim 2, further comprising a power supply circuit supplying multiple voltages, wherein the predetermined potential is equal to one of voltages supplied from the power supply circuit to the source signal line drive circuit, the one of voltages being the closest to a mean value of potentials of the source signal lines of the first display means carrying out a display operation.

10. The display as set forth in claim 9, wherein the predetermined potential is supplied to the gate signal lines of the second display means during the recursive temporary switch-on actions.

11. The display as set forth in claim 1, wherein the predetermined potential is equal to a potential of an opposite electrode of the second display means.

12. The display as set forth in claim 11, wherein the predetermined potential is supplied to the gate signal lines of the second display means during the recursive temporary switch-on actions.

13. The display as set forth in claim 1, wherein the predetermined potential and a potential of an opposite electrode of the second display means are both equal to GND during the recursive temporary switch-on actions.

14. The display as set forth in claim 13, wherein the predetermined potential is supplied to the gate signal lines of the second display means during the recursive temporary switch-on actions.

15. The display as set forth in claim 1, wherein the predetermined potential is equal to a mean value of potentials of the source signal lines of the first display means carrying out a display operation.

16. The display as set forth in claim 15, wherein the predetermined potential is supplied to the gate signal lines of the second display means during the recursive temporary switch-on actions.

17. The display as set forth in claim 1, further comprising a power supply circuit supplying multiple voltages, wherein the predetermined potential is equal to one of voltages supplied from the power supply circuit to the source signal line drive circuit, the one of voltages being the closest to a mean value of potentials of the source signal lines of the first display means carrying out a display operation.

18. The display as set forth in claim 17, wherein the voltage closest to the mean value of the potentials of the source signal lines of the first display means carrying out the display operation, as the predetermined potential, is simultaneously supplied to an opposite electrode of the second display means.

19. The display as set forth in claim 17, wherein the predetermined potential is supplied to the gate signal lines of the second display means during the recursive temporary switch-on actions.

20. The display as set forth in claim 1, wherein the second display means carries out a display operation less frequently than the first display means.

21. The display as set forth in claim 1, wherein the first display means has fewer pixels than the second display means.

22. The display as set forth in claim 1, wherein:
the first display means and the second display means are provided in a device in which a second housing section opens/closes on a first housing section;
the first display means is provided so that when the second housing section is closed on the first housing section, a display plane of the first display means is on an outside face of either the first or second housing section; and
the second display means is provided so that when the second housing section is closed on the first housing section, a display plane of the second display means is on an inside face of either the first or second housing section.

23. A display, comprising:
a first display panel including: gate signal lines; source signal lines; first switching elements provided near intersections of the gate signal lines and the source signal lines, control terminals for switching operation of the first switching elements being connected to the gate signal lines; and pixel electrodes connected to the source signal lines through the first switching elements;
a source signal line drive circuit provided to the first display panel to supply display data signals to the source signal lines;
second switching elements containing semiconductor elements;
a second display panel including: the gate signal lines; source signal lines; first switching elements; and pixel electrodes, the source signal lines of the second display panel being connected to the associated source signal lines of the first display panel through the second switching elements, the second display panel sharing the source signal line drive circuit with the first display panel; and
a predetermined potential supply circuit briefly and repeatedly supplying a predetermined potential to the source signal lines of the second display panel when the second switching elements are off.

24. A display, comprising:
first display means including: gate signal lines; source signal lines; first switching means provided near intersections of the gate signal lines and the source signal lines, control terminals for switching operation of the first switching means being connected to the gate signal lines; and pixel electrodes connected to the source signal lines through the first switching means;

a source signal line drive circuit provided to the first display means to supply display data signals to the source signal lines;

second switching means containing semiconductor elements;

second display means including: the gate signal lines; source signal lines; first switching means; and pixel electrodes, the source signal lines of the second display means being connected to the associated source signal lines of the first display means through the second switching means, the second display means sharing the source signal line drive circuit with the first display means; and a control circuit: controlling on/off operation of the second switching means; causing the second switching means to carry out recursive temporary switch-on actions where the second switching means briefly and repeatedly switches on when the second switching means is off; and causing the source signal line drive circuit to supply a predetermined potential to the source signal lines of the first display means during the recursive temporary switch-on actions.

25. The display as set forth in claim 24, wherein the recursive temporary switch-on actions are carried out at a cycle equal to an integral multiple of a vertical interval for the second display means.

26. The display as set forth in claim 25, wherein the predetermined potential is equal to a potential of an opposite electrode of the second display means.

27. The display as set forth in claim 26, wherein the predetermined potential is supplied to the gate signal lines of the second display means during the recursive temporary switch-on actions.

28. The display as set forth in claim 25, wherein the predetermined potential and a potential of an opposite electrode of the second display means are both equal to GND during the recursive temporary switch-on actions.

29. The display as set forth in claim 28, wherein the predetermined potential is supplied to the gate signal lines of the second display means during the recursive temporary switch-on actions.

30. The display as set forth in claim 25, wherein the predetermined potential is equal to a mean value of potentials of the source signal lines of the first display means carrying out a display operation.

31. The display as set forth in claim 30, wherein the predetermined potential is supplied to the gate signal lines of the second display means during the recursive temporary switch-on actions.

32. The display as set forth in claim 25, further comprising a power supply circuit supplying multiple voltages, wherein the predetermined potential is equal to one of voltages supplied from the power supply circuit to the source signal line drive circuit, the one of voltages being the closest to a mean value of potentials of the source signal lines of the first display means carrying out a display operation.

33. The display as set forth in claim 32, wherein the predetermined potential is supplied to the gate signal lines of the second display means during the recursive temporary switch-on actions.

34. The display as set forth in claim 24, wherein the predetermined potential is equal to a potential of an opposite electrode of the second display means.

35. The display as set forth in claim 34, wherein the predetermined potential is supplied to the gate signal lines of the second display means during the recursive temporary switch-on actions.

36. The display as set forth in claim 24, wherein the predetermined potential and a potential of an opposite electrode of the second display means are both equal to GND during the recursive temporary switch-on actions.

37. The display as set forth in claim 36, wherein the predetermined potential is supplied to the gate signal lines of the second display means during the recursive temporary switch-on actions.

38. The display as set forth in claim 24, wherein the predetermined potential is equal to a mean value of potentials of the source signal lines of the first display means carrying out a display operation.

39. The display as set forth in claim 38, wherein the predetermined potential is supplied to the gate signal lines of the second display means during the recursive temporary switch-on actions.

40. The display as set forth in claim 24, further comprising a power supply circuit supplying multiple voltages, wherein the predetermined potential is equal to one of voltages supplied from the power supply circuit to the source signal line drive circuit, the one of voltages being the closest to a mean value of potentials of the source signal lines of the first display means carrying out a display operation.

41. The display as set forth in claim 40, wherein the voltage closest to the mean value of the potentials of the source signal lines of the first display means carrying out the display operation, as the predetermined potential, is simultaneously supplied to an opposite electrode of the second display means.

42. The display as set forth in claim 40, wherein the predetermined potential is supplied to the gate signal lines of the second display means during the recursive temporary switch-on actions.

43. The display as set forth in claim 24, wherein the second display means carries out a display operation less frequently than the first display means.

44. The display as set forth in claim 24, wherein the first display means has fewer pixels than the second display means.

45. The display as set forth in claim 24, wherein:
the first display means and the second display means are provided in a device in which a second housing section opens/closes on a first housing section;
the first display means is provided so that when the second housing section is closed on the first housing section, a display plane of the first display means is on an outside face of either the first or second housing section; and
the second display means is provided so that when the second housing section is closed on the first housing section, a display plane of the second display means is on an inside face of either the first or second housing section.

46. A display, comprising:
a first display panel including: gate signal lines; source signal lines; first switching elements provided near intersections of the gate signal lines and the source signal lines, control terminals for switching operation of the first switching elements being connected to the gate signal lines; and pixel electrodes connected to the source signal lines through the first switching elements;

a source signal line drive circuit provided to the first display panel to supply display data signals to the source signal lines;

second switching elements containing semiconductor elements;

a second display panel including: the gate signal lines; source signal lines; first switching elements; and pixel electrodes, the source signal lines of the second display panel being connected to the associated source signal lines of the first display panel through the second switching elements, the second display panel sharing the source signal line drive circuit with the first display panel; and a control circuit: controlling on/off operation of the second switching elements; causing the second switching elements to carry out recursive temporary switch-on actions where the second switching elements briefly and repeatedly switch on when the second switching elements are off; and causing the source signal line drive circuit to supply a predetermined potential to the source signal lines of the first display panel during the recursive temporary switch-on actions.

47. A method of driving a display including first display means and second display means, the first display means including: gate signal lines; source signal lines; first switching means provided near intersections of the gate signal lines and the source signal lines, control terminals for switching operation of the first switching means being connected to the gate signal lines; and pixel electrodes connected to the source signal lines through the first switching means, the second display means including: the gate signal lines; source signal lines; first switching means; and pixel electrodes, the method comprising the steps of:

connecting the source signal lines of the second display means to the associated source signal lines of the first display means through second switching means containing semiconductor elements;

supplying display data signals to the source signal lines of the second display means through the source signal lines of the first display means; and briefly and repeatedly supplying a predetermined potential to the source signal lines of the second display means when the second switching means is off.

48. The method as set forth in claim 47, wherein the recursive temporary switch-on actions are carried out at a cycle equal to an integral multiple of a vertical interval for the second display means.

49. The method as set forth in claim 48, wherein the predetermined potential is equal to a potential of an opposite electrode of the second display means.

50. The method as set forth in claim 49, wherein the predetermined potential is supplied to the gate signal lines of the second display means during the recursive temporary switch-on actions.

51. The method as set forth in claim 48, wherein the predetermined potential and a potential of an opposite electrode of the second display means are both equal to GND during the recursive temporary switch-on actions.

52. The method as set forth in claim 51, wherein the predetermined potential is supplied to the gate signal lines of the second display means during the recursive temporary switch-on actions.

53. The method as set forth in claim 48, wherein the predetermined potential is equal to a mean value of potentials of the source signal lines of the first display means carrying out a display operation.

54. The method as set forth in claim 53, wherein the predetermined potential is supplied to the gate signal lines of the second display means during the recursive temporary switch-on actions.

55. The method as set forth in claim 48, wherein the display data signals are supplied from a source signal line drive circuit to the source signal lines, and the predetermined potential is equal to one of voltages supplied to the source signal line drive circuit, the one of voltages being the closest to a mean value of potentials of the source signal lines of the first display means carrying out a display operation.

56. The method as set forth in claim 55, wherein the voltage closest to the mean value of the potentials of the source signal lines of the first display means carrying out the display operation, as the predetermined potential, is simultaneously supplied to an opposite electrode of the second display means.

57. The method as set forth in claim 55, wherein the predetermined potential is supplied to the gate signal lines of the second display means during the recursive temporary switch-on actions.

58. The method as set forth in claim 47, wherein the predetermined potential is equal to a potential of an opposite electrode of the second display means.

59. The method as set forth in claim 58, wherein the predetermined potential is supplied to the gate signal lines of the second display means during the recursive temporary switch-on actions.

60. The method as set forth in claim 47, wherein the predetermined potential and a potential of an opposite electrode of the second display means are both equal to GND during the recursive temporary switch-on actions.

61. The method as set forth in claim 60, wherein the predetermined potential is supplied to the gate signal lines of the second display means during the recursive temporary switch-on actions.

62. The method as set forth in claim 47, wherein the predetermined potential is equal to a mean value of potentials of the source signal lines of the first display means carrying out a display operation.

63. The method as set forth in claim 62, wherein the predetermined potential is supplied to the gate signal lines of the second display means during the recursive temporary switch-on actions.

64. The method as set forth in claim 47, wherein the display data signals are supplied from a source signal line drive circuit to the source signal lines, and the predetermined potential is equal to one of voltages supplied to the source signal line drive circuit, the one of voltages being the closest to a mean value of potentials of the source signal lines of the first display means carrying out a display operation.

65. The method as set forth in claim 64, wherein the voltage closest to the mean value of the potentials of the source signal lines of the first display means carrying out the display operation, as the predetermined potential, is simultaneously supplied to an opposite electrode of the second display means.

66. The method as set forth in claim 64, wherein the predetermined potential is supplied to the gate signal lines of the second display means during the recursive temporary switch-on actions.

67. A method of driving a display including first display means and second display means, the first display means including: gate signal lines; source signal lines; first switching means provided near intersections of the gate signal lines and the source signal lines, control terminals for switching operation of the first switching means being connected to the gate signal lines; and pixel electrodes connected to the source signal lines through the first switching means, the second display means including: the gate signal lines; source signal lines; first switching means; and pixel electrodes, the method comprising the steps of:

connecting the source signal lines of the second display means to the associated source signal lines of the first display means through second switching means containing semiconductor elements;

supplying display data signals to the source signal lines of the second display means through the source signal lines of the first display means; and causing the second switching means to carry out recursive temporary switch-on actions where the second switching means briefly and repeatedly switches on when the second switching means is off; and supplying a predetermined potential to the source signal lines of the first display means during the recursive temporary switch-on actions.

68. The method as set forth in claim 67, wherein the recursive temporary switch-on actions are carried out at a cycle equal to an integral multiple of a vertical interval for the second display means.

69. The method as set forth in claim 68, wherein the predetermined potential is equal to a potential of an opposite electrode of the second display means.

70. The method as set forth in claim 69, wherein the predetermined potential is supplied to the gate signal lines of the second display means during the recursive temporary switch-on actions.

71. The method as set forth in claim 68, wherein the predetermined potential and a potential of an opposite electrode of the second display means are both equal to GND during the recursive temporary switch-on actions.

72. The method as set forth in claim 71, wherein the predetermined potential is supplied to the gate signal lines of the second display means during the recursive temporary switch-on actions.

73. The method as set forth in claim 48, wherein the predetermined potential is equal to a mean value of potentials of the source signal lines of the first display means carrying out a display operation.

74. The method as set forth in claim 73, wherein the predetermined potential is supplied to the gate signal lines of the second display means during the recursive temporary switch-on actions.

75. The method as set forth in claim 68, wherein the display data signals are supplied from a source signal line drive circuit to the source signal lines, and the predetermined potential is equal to one of voltages supplied to the source signal line drive circuit, the one of voltages being the closest to a mean value of potentials of the source signal lines of the first display means carrying out a display operation.

76. The method as set forth in claim 75, wherein the voltage closest to the mean value of the potentials of the source signal lines of the first display means carrying out the display operation, as the predetermined potential, is simultaneously supplied to an opposite electrode of the second display means.

77. The method as set forth in claim 75, wherein the predetermined potential is supplied to the gate signal lines of the second display means during the recursive temporary switch-on actions.

78. The method as set forth in claim 67, wherein the predetermined potential is equal to a potential of an opposite electrode of the second display means.

79. The method as set forth in claim 78, wherein the predetermined potential is supplied to the gate signal lines of the second display means during the recursive temporary switch-on actions.

80. The method as set forth in claim 67, wherein the predetermined potential and a potential of an opposite electrode of the second display means are both equal to GND during the recursive temporary switch-on actions.

81. The method as set forth in claim 80, wherein the predetermined potential is supplied to the gate signal lines of the second display means during the recursive temporary switch-on actions.

82. The method as set forth in claim 67, wherein the predetermined potential is equal to a mean value of potentials of the source signal lines of the first display means carrying out a display operation.

83. The method as set forth in claim 82, wherein the predetermined potential is supplied to the gate signal lines of the second display means during the recursive temporary switch-on actions.

84. The method as set forth in claim 67, wherein the display data signals are supplied from a source signal line drive circuit to the source signal lines, and the predetermined potential is equal to one of voltages supplied to the source signal line drive circuit, the one of voltages being the closest to a mean value of potentials of the source signal lines of the first display means carrying out a display operation.

85. The method as set forth in claim 84, wherein the voltage closest to the mean value of the potentials of the source signal lines of the first display means carrying out the display operation, as the predetermined potential, is simultaneously supplied to an opposite electrode of the second display means.

86. The method as set forth in claim 84, wherein the predetermined potential is supplied to the gate signal lines of the second display means during the recursive temporary switch-on actions.

* * * * *